(12) United States Patent
Basu

(10) Patent No.: US 12,742,899 B1
(45) Date of Patent: Sep. 22, 2026

(54) METHODS AND SYSTEMS FOR DETERMINING GROUND MOTION IN A SIMULATION OF SEISMIC SOIL-STRUCTURE INTERACTION

(71) Applicant: ANSYS, Inc., Canonsburg, PA (US)

(72) Inventor: Ushnish Basu, Dublin, CA (US)

(73) Assignee: ANSYS, INC., Canonsburg, PA (US)

( * ) Notice: Subject to any disclaimer, the term of this patent is extended or adjusted under 35 U.S.C. 154(b) by 954 days.

(21) Appl. No.: 18/079,322

(22) Filed: Dec. 12, 2022

(51) Int. Cl.
*G06F 7/48* (2006.01)
*G01V 1/28* (2006.01)
*G01V 1/30* (2006.01)

(52) U.S. Cl.
CPC .............. *G01V 1/282* (2013.01); *G01V 1/305* (2013.01); *G01V 1/306* (2013.01); *G01V 2210/6222* (2013.01)

(58) Field of Classification Search
CPC ........ G01V 1/282; G01V 1/305; G01V 1/306; G01V 2210/6222
See application file for complete search history.

(56) References Cited

U.S. PATENT DOCUMENTS 12,265,192 B2 * 4/2025 Michael ................ G01V 20/00

OTHER PUBLICATIONS

Aagaard, Brad T., John F. Hall, and Thomas H. Heaton. "Characterization of near-source ground motions with earthquake simulations." Earthquake Spectra 17.2 (2001): 177-207. (Year: 2001).*
Chaljub, Emmanuel, et al. "3-D numerical simulations of earthquake ground motion in sedimentary basins: testing accuracy through stringent models." Geophysical Journal International 201.1 (2015): 90-111. (Year: 2015).*
Klin, Peter, Enrico Priolo, and Geza Seriani. "Numerical simulation of seismic wave propagation in realistic 3-D geo-models with a Fourier pseudo-spectral method." Geophysical Journal International 183.2 (2010): 905-922. (Year: 2010).*
Schnabel, et al. "Shake a computer program for earthquake response analysis of horizontally layered sites" Earthquake Engineering Research Center, Report No. EERC 72—Dec. 12, 1972.

* cited by examiner

*Primary Examiner* — Nithya J. Moll
(74) *Attorney, Agent, or Firm* — Douglas A. Gastright

(57) ABSTRACT

A three-dimensional (3D) model representing a soil domain and a ground motion time history recorded/measured at the top of the soil domain in a seismic event are received in a computer system. A single-column model representing horizontal soil layers is generated from the 3D model. The single-column model contains nodal points mapped from nodes on the bottom and sides of the 3D model in the depth direction of the soil domain. A time interval is determined for interpolating the ground motion time history for calculating soil motion and stresses at the nodal points along the single-column model. The time interval is to avoid numerical problem in the computer system by limiting computer memory usage and by limiting calculated soil motion at the bottom of the single-column model. The seismic event is simulated based on the 3D model applied with the soil motion and stresses transferred from the single-column model.

20 Claims, 25 Drawing Sheets

600

900

1420

METHODS AND SYSTEMS FOR DETERMINING GROUND MOTION IN A SIMULATION OF SEISMIC SOIL-STRUCTURE INTERACTION

TECHNICAL FIELD

The subject matter described herein relates to computer-aided engineering analysis (CAE), more particularly to methods and systems for determining ground motion for a simulation of soil-structure interaction in a seismic event (e.g., an earthquake).

BACKGROUND

Seismic analysis is the study of how earthquakes and other seismic events affect buildings, soils and the rocks of the Earth itself. As a field of study within structural engineering, seismic analysis is often used to study potential damage to buildings and other structures due to earthquakes. In geology, seismic analysis is used to study the interior of the Earth by analyzing the way seismic waves travel through the materials that make up the planet.

With advance of computer technologies, seismic analysis as a subset of computational structural analysis is conducted with a simulation of a seismic event (e.g., earthquake) in a computer system. In order to obtain realistic predictions, soil domain needs to be included in a simulation. Ground-structure interaction (SSI) consists of the interaction between soil (ground) and a structure built upon it. It is primarily an exchange of mutual stress, whereby the movement of the ground-structure system is influenced by both the type of ground and the type of structure. This is especially applicable to areas of seismic activity. Various combinations of soil and structure can either amplify or diminish movement and subsequent damage.

SUMMARY

According to one aspect of the disclosure, a three-dimensional (3D) model representing a soil domain and a ground motion time history recorded/measured at the top of the soil domain in a seismic event are received in a computer system. A single-column model representing horizontal soil layers is generated from the 3D model. The single-column model contains nodal points mapped from nodes on the bottom and sides of the 3D model in the depth direction of the soil domain. A time interval is determined for interpolating the ground motion time history for calculating soil motion and stresses at the nodal points along the single-column model. The time interval is to avoid numerical problem in the computer system by limiting computer memory usage and by limiting calculated soil motion at the bottom of the single-column model. The seismic event is simulated based on the 3D model applied with the soil motion and stresses transferred from the single-column model.

According to another aspect, the single-column model is updated by merging neighboring or adjacent or next element with the current element in determination of the time interval for interpolating the ground motion time history.

Non-transitory computer-readable medium (i.e., physically embodied computer program products) is described, which stores instructions, which when executed by one or more data processors of one or more computing systems, cause at least one data processor to perform operations herein. Similarly, computer systems are described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store a program and/or data for use by or in connection with an instruction execution system, apparatus, or device. Even if the data in the computer-readable storage medium requires action to maintain the storage of data, such as in a traditional semiconductor-based dynamic random access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium.

According to this disclosure, one object is to improve the efficiency usage of computer resource when simulating seismic soil-structure interaction in a computer system. Another objective is to improve simulation results by limiting numerical inaccuracy due to using finite digits to represent a real number (i.e., a floating point number) in a computer system.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
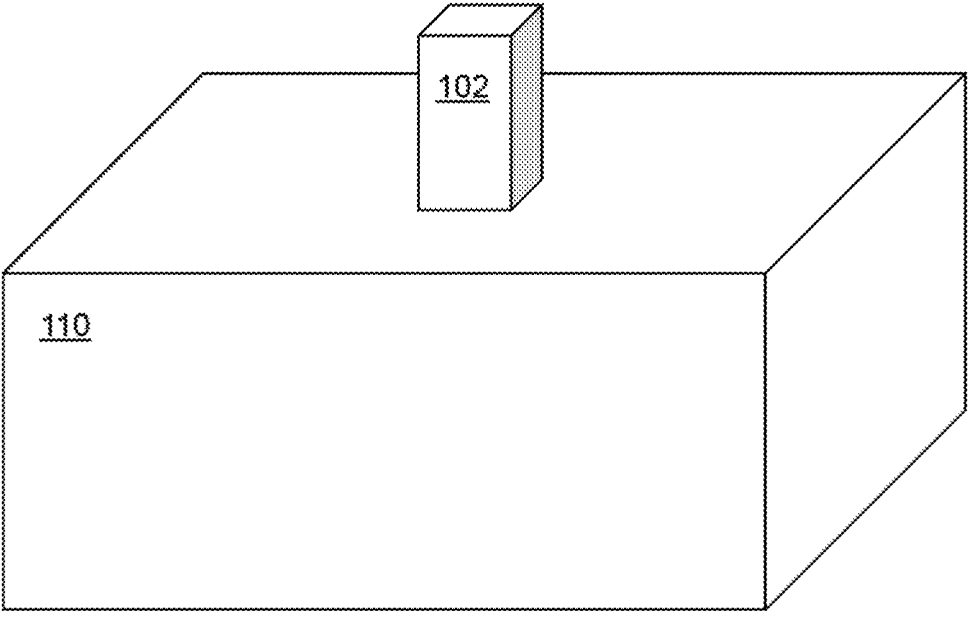
FIG. 1 is a diagram showing an example building located on top of a soil domain.

Systems and methods of determining soil/ground motion for a simulation of soil-structure interaction in a seismic event (e.g., an earthquake) are disclosed. According to one example embodiment, a three-dimensional (3D) model representing a soil domain and a ground motion time history recorded/measured in the soil domain in a seismic event are received in a computer system. The time history is typically measured at the top of the soil domain, but may be measured at some depth below the top also. A single-column model representing horizontal soil layers is generated from the 3D model. The single-column model contains nodal points mapped from nodes on the bottom and sides of the 3D model in the depth direction of the soil domain. A time interval is determined for interpolating the ground motion time history for calculating soil motion and stresses at the nodal points along the single-column model. The time interval is determined to avoid numerical problem in the computer system by limiting computer memory usage and by limiting calculated soil motion at the bottom of the single-column model. The seismic event is simulated based on the 3D model applied with the soil motion and stresses transferred from the single-column model.

When determining a time interval for interpolating the ground motion time history, the single-column model can be updated or modified by merging neighboring elements (generally very small elements) together to form a larger element such that the computation efficiency can be achieved without losing qualities of the simulation.

When determining the time interval, condition number of the stiffness matrix of the updated single-column model is limited to avoid numerical problem in implicit FEA.

When determining the time interval, Courant timestep value is checked to avoid numerical problem in explicit FEA.

Some of the terms used in this documents are defined as follows:

Ground Motion in Earthquakes

Ground motion is the movement of the earth's surface from earthquakes or explosions. Ground motion is produced by waves that are generated by sudden slip on a fault or sudden pressure at the explosive source and travel through the earth and along its surface.

Deconvolution

It is assumed that seismic wave is traveling vertically upward. Therefore, a soil domain can be represented by a soil column. One dimensional wave propagation theory is applied on the soil column to compute the soil motion (and stresses) at each nodal point from the ground motion at the top, and then transfer the calculated soil motion to the corresponding nodes on the 3D model.

Finite Element Method/Analysis

Finite element analysis (FEA) is a computerized method widely used in industry to model and solve engineering problems relating to complex systems. FEA derives its name from the manner in which the geometry of the object under consideration is specified. With the advent of the modern digital computer, FEA has been implemented as FEA software. Basically, the FEA software is provided with a model of the geometric description and the associated material properties at each point within the model. In this model, the geometry of the system under analysis is represented by solids, shells and beams of various sizes, which are called elements. The vertices of the elements are referred to as nodes. The model is comprised of a finite number of elements, which are assigned a material name to associate with material properties. The model thus represents the physical space occupied by the object under analysis along with its immediate surroundings. The FEA software then refers to a table in which the properties (e.g., stress-strain constitutive equation, Young's modulus, Poisson's ratio, thermo-conductivity) of each material type are tabulated. Additionally, the conditions at the boundary of the object (i.e., loadings, constraints, etc.) are specified. Boundary conditions can include known displacements at specific degree-of-freedom (DOF). Constraints may be a surface-based constraint for coupling displacements/movements of two nodes in a model. In this fashion a model of the object and its environment is created.

Explicit vs. Implicit Methods

In general, finite element analysis begins by generating a finite element model of a system. In this model, a subject structure is reduced into a number of node points which are connected together to form finite elements. Governing equations of motion are written in a discrete form, where the motions of each node point are the unknown part of the solution. A simulated load or other influence is applied to the system and the resulting effect is analyzed using well known mathematical methods.

Two such mathematical methods are the implicit finite element method ("the implicit method") and the explicit finite element method ("the explicit method"). These methods are used to solve transient dynamic equations of motion and thus obtain equilibrium solutions to the equations.

Conventional computer simulations are performed using either implicit method finite element software or explicit method finite element software.

The implicit method is characterized by the formation of a stiffness matrix to represent the interaction of nodal motions within the structure. In the implicit solution process, the stiffness matrix is assembled, its inverse is computed, and this inverse is applied to an array of nodal forces to produce a solution of nodal displacements. For nonlinear problems, these displacements are tested to verify that they satisfy the governing equations of motion. If the equations are not satisfied, an iterative procedure is applied to refine the accuracy of the solution. When a satisfactory solution is finally obtained, the iterative process is said to have converged. Successful convergence of these iterations is not guaranteed and can be very difficult in practice.

The explicit method is based on a statement of dynamic equilibrium: force is equal to the product of mass and acceleration. This condition is applied independently at each node point. Thus, at each node point, forces are assembled, and the acceleration of each node is computed simply by dividing by nodal mass. This process is repeated as the solution is incrementally advanced in time, integrating the nodal accelerations to obtain velocity and displacement. In order for this solution to remain stable, a limit is placed on the maximum size of the time step. This limit, known as the Courant condition, is typically less than one microsecond in automotive applications. This means that over one million time steps are often required to simulate one second of structural response.

Courant Timestep

Courant timestep is the time for wave (e.g., sound wave, seismic wave, etc.) travelling through a distance (e.g., smallest element dimension or size).

Condition Number

The condition number of a matrix is very important since it represents how much change reflects in the output with a minor change in the input. If a condition number of a matrix is small, it is well conditioned problem and that can be handled efficiently and accurately while if the condition number is large, the problem is ill-conditioned and cannot be handled accurately. The condition number of an invertible matrix A is defined as: $\kappa(A)=\|A\|\|A^{-1}\|$. $\|A\|$ represents norm of matrix A.

Figure 2:
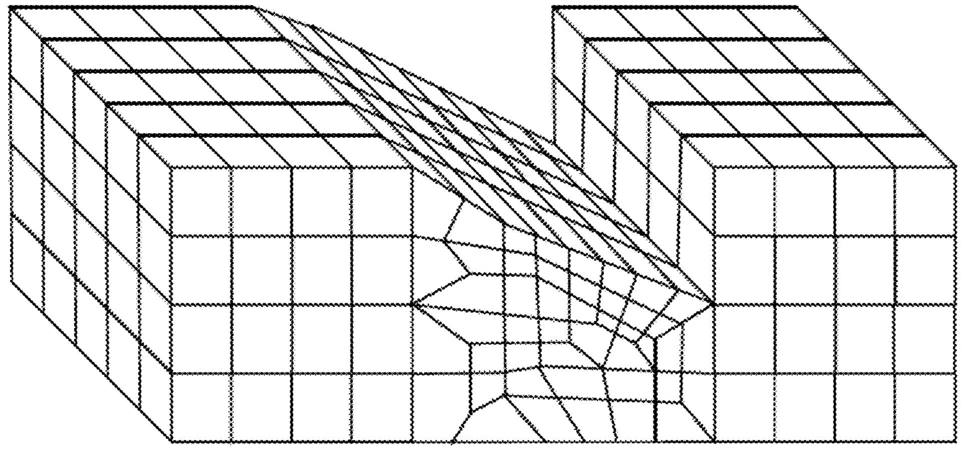
FIG. 2 is a diagram showing an example 3D model containing unstructured mesh representing a soil domain.

Referring first to FIG. 1, it is shown a structure 102 located on top of a soil domain 110. Although the soil domain 110 is shown as a box or rectangular prism, other shapes may be used, for example, a hemisphere, a half ellipsoid, or other arbitrary 3D shapes. The soil domain 110 needs to be large enough to capture soil motion in a seismic event such that soil-structure interaction can be properly simulated, for example, based on finite element methods. The structure 102 can be a building, a tower, an earth dam, a bridge, a highway, etc. In one embodiment, the soil domain 110 can be represented with a finite element mesh model (structured or unstructured). An example unstructured 3D mesh model 200 is shown in FIG. 2. In order to simulate soil-structure interaction, soil motions along the depth or vertical direction of the 3D model 200 must be specified. The soil motions can be calculated from a ground motion time history specified/measured/recorded at the top of the soil domain.

Figure 3:
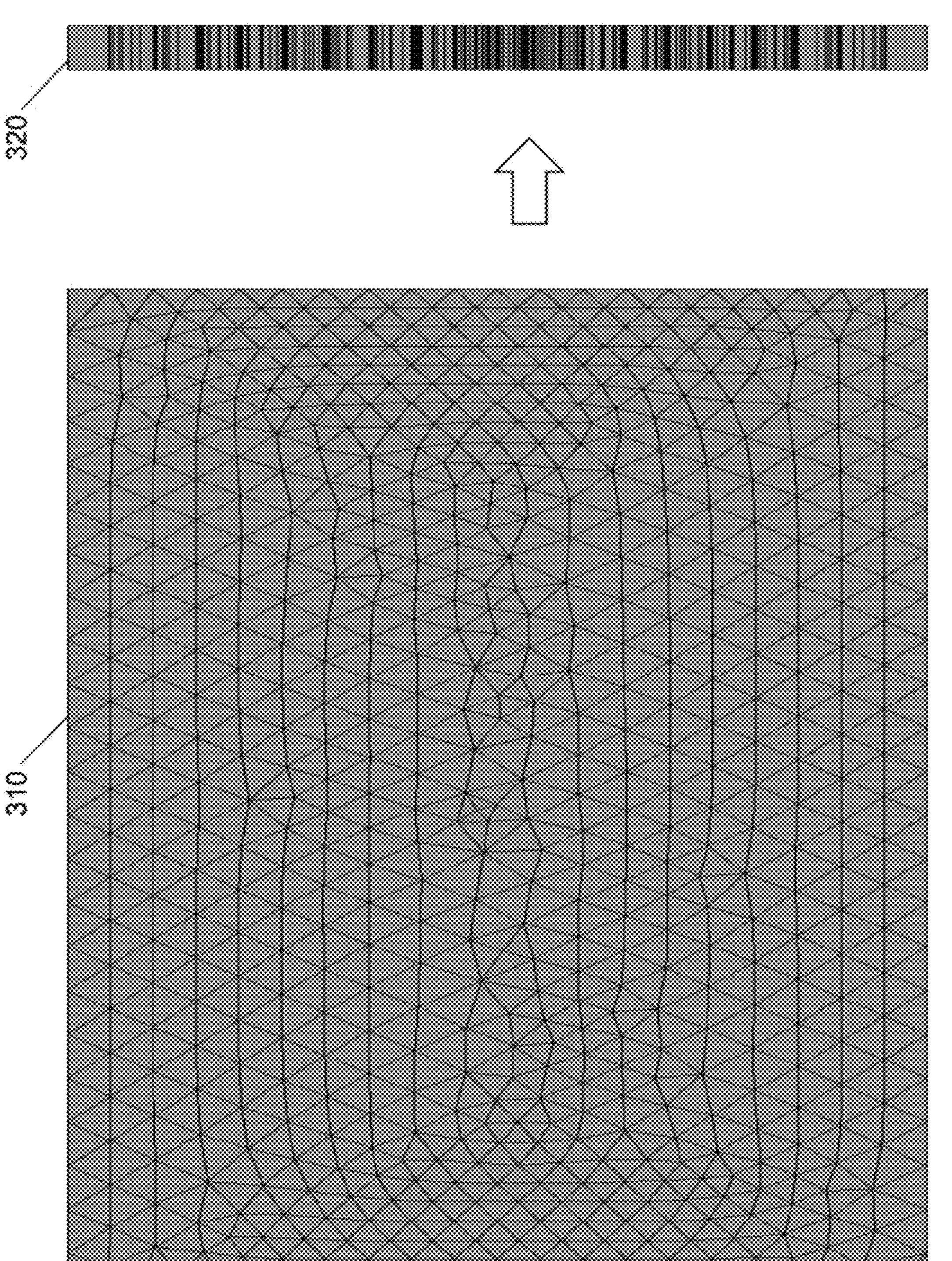
FIG. 3 is a 2D diagram showing an example single-column model and a 3D model.
Figure 4A:
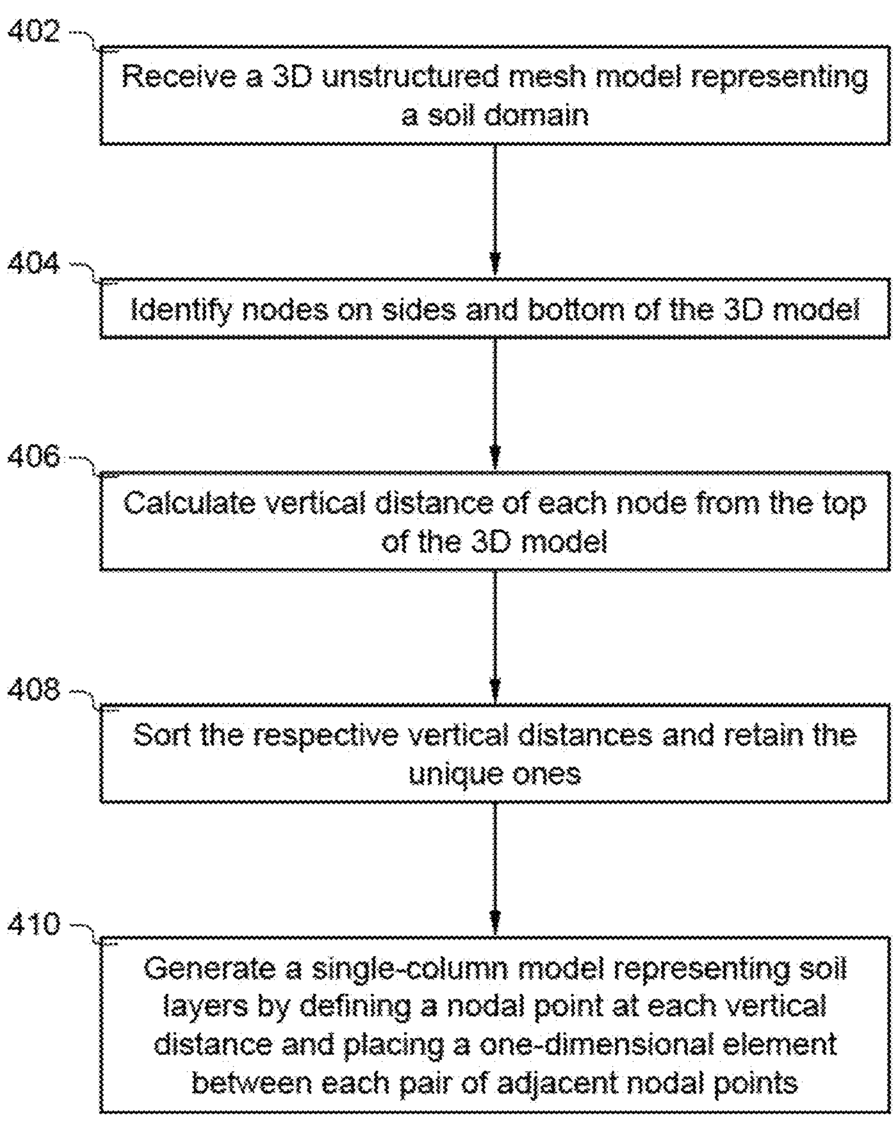
FIG. 4A shows a flow diagram illustrating an example process of generating a single-column model from a 3D model representing a soil domain.

FIG. 3 is an elevation view of an unstructured 3D mesh model 310 representing a soil domain and a corresponding single-column model 320 representing soil layers in the soil domain. Nodal points in the single-column model 320 are generated from nodes of sides and bottom of the 3D mesh model 310. Each nodal point in the single-column model 320 corresponds to one or more nodes in the 3D mesh model 310. This correlation is used as the basis for transferring calculated soil motion and stresses from the single-column model 320 to the 3D mesh model 310. FIG. 4A shows an example process 400 of generating a single-column model from the 3D unstructured mesh model. Process 400 starts in action 402 by receiving a 3D unstructured mesh model representing a soil domain in a computer system (e.g., computer systems 1400, 1420 in FIGS. 14A-14B). The 3D model can be a finite element model containing many solid elements (e.g., tetrahedral or hexahedral elements). In action 404, nodes on sides and the bottom of the 3D model are identified. Respective vertical distances from the top of the 3D model are calculated for all of the nodes in action 406. Next, in action 408, the respective vertical distances are sorted, and only unique distances are retained. As part of this action, a mapping is created between the original list of vertical distances created in action 406, and the unique, sorted list. In action 410, a single-column model is generated by defining a nodal point at each unique vertical distance. The mapping created previously in action 408 thus also specifies a mapping between the nodes on sides and bottom of the 3D model as identified in action 404, and these nodes of the single-column model, such that all nodes having the same vertical depth in the 3D model map to the corresponding node on the single-column model having the same depth. A one-dimensional element is placed between each pair of adjacent or neighboring nodal points. As a result, the single-column model represents soil layers in the soil domain. The single-column model is used for calculating soil motions at respective soil layers in the soil domain based on the ground motion time history at the top of the soil domain. The motion and stresses on each node on the sides and bottom of the 3D model can then be assigned to be equal to those of the corresponding nodal point on the single-column model, thereby transferring the motion and stresses from the single-column model to the 3D model.

Figure 4B:
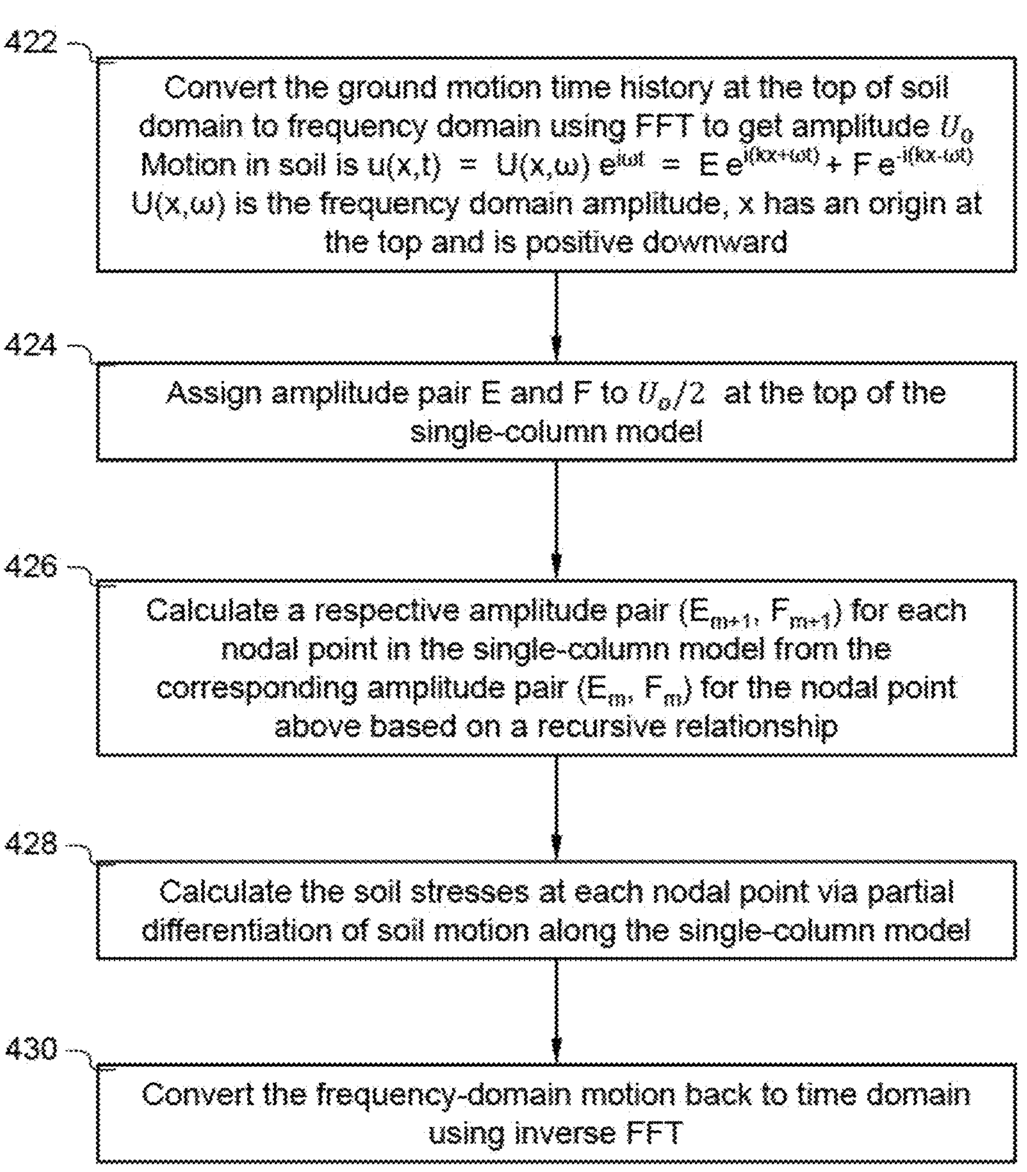
FIG. 4B shows a flow diagram illustrating an example deconvolution process of calculating ground motion at bottom of a soil domain from the ground motion time history at the top of the soil domain.
Figure 7:
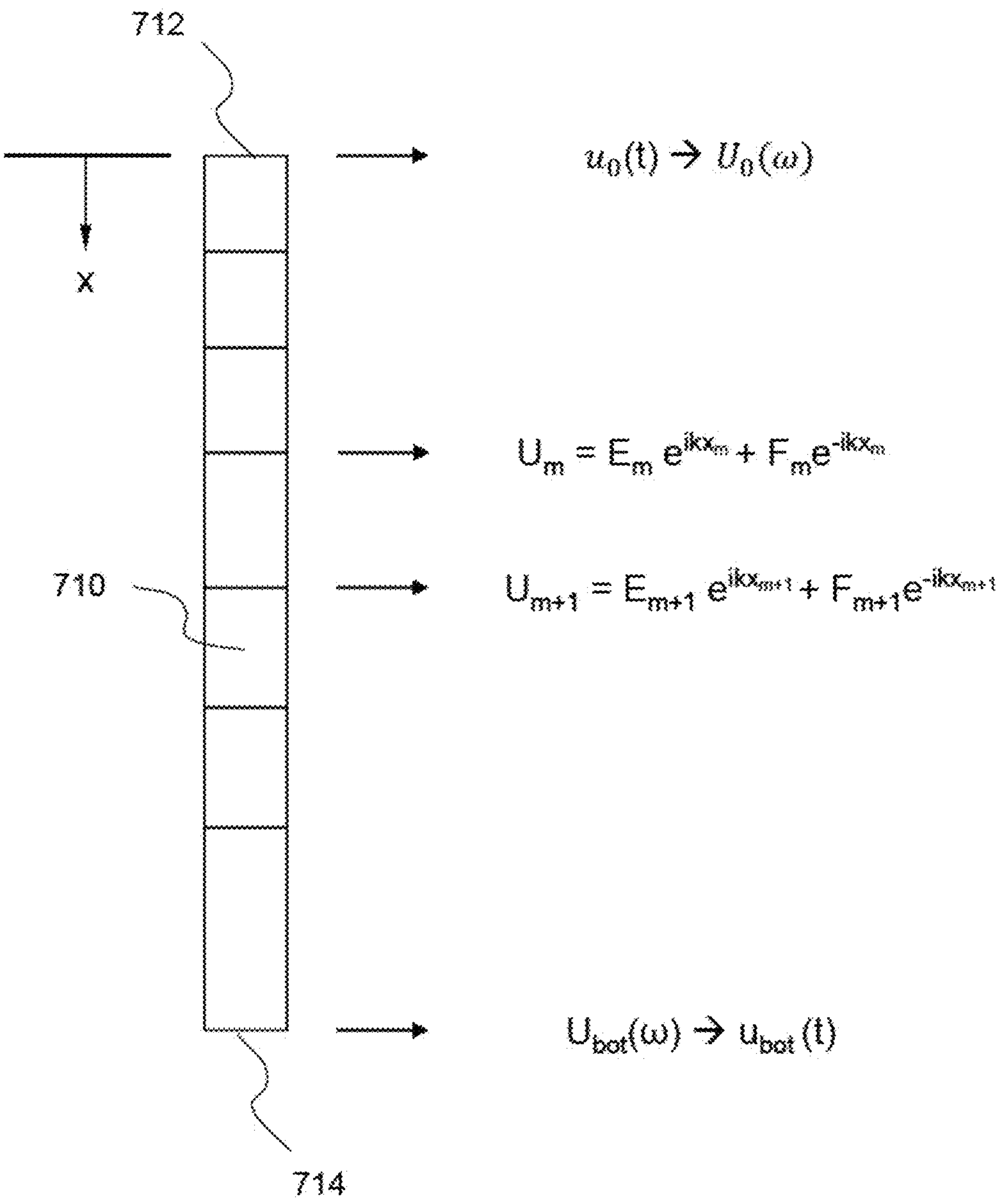
FIG. 7 is a diagram showing example single-column model.

FIG. 4B is a flow diagram illustrating an example deconvolution process 420 of computing soil motion along the depth direction of a soil domain based on an input ground motion time history at the top of the soil domain. FIG. 7 can be used in conjunction with process 420.

Process 420 starts at action 422 by converting the ground motion time history to frequency domain via Fast Fourier Transform (FFT), to obtain the frequency-domain amplitude $U_0(\omega)$. The motion in the soil column can be represented using the below formula:

$$u(x,t)\rightarrow U(x,\omega)e^{i\omega t}=Ee^{i(kx+\omega t)}+Fe^{-i(kx-\omega t)} \quad (1)$$

where:

$u(x,t)$ is the ground motion time history within the soil domain.

$U(x,\omega)$ is the frequency domain amplitude for soil displacement at x.

x is a coordinate with an origin at the top of soil domain and positive downwards.

$\omega$ is frequency.

t is time.

k is seismic wave number in complex.

$Ee^{i(kx+\omega t)}$ represents the incident seismic wave traveling in the upward direction (negative x-direction).

$Fe^{-i(kx-\omega t)}$ represents the reflected seismic wave traveling in the downward direction (positive x-direction).

Details of formula (1) can be found in a document entitled: "SHAKE, a computer program for earthquake response analysis of horizontally layered sites" by Per B. Schnabel et al. December 1972, College of Engineering, University of California, Berkeley, California.

Next, at action 424, the amplitude or coefficient pair E and F is assigned value of $U_0/2$ at the top of the single-column model. Then, at action 426, a respective amplitude or coefficient pair ($E_{m+1}$, $F_{m+1}$) at each nodal point is calculated from the corresponding amplitude or coefficient pair ($E_m$, $F_m$) at the nodal point below in the single-column model based on a recursive relationship. Soil stresses can then be calculated with a partial differentiation of soil motion along the single-column model at action 428. At action 430, the deconvolved motion (i.e., frequency domain soil motion) at any depth of the single-column model can be converted to time domain using inverse FFT. If the input ground motion history is specified not at the top of the column, but at some depth below the top, then the amplitude at each node can be adjusted so that the ratio of amplitudes between two nodes remains the same, but amplitude at the specified depth matches that of the input motion.

Figure 5A:
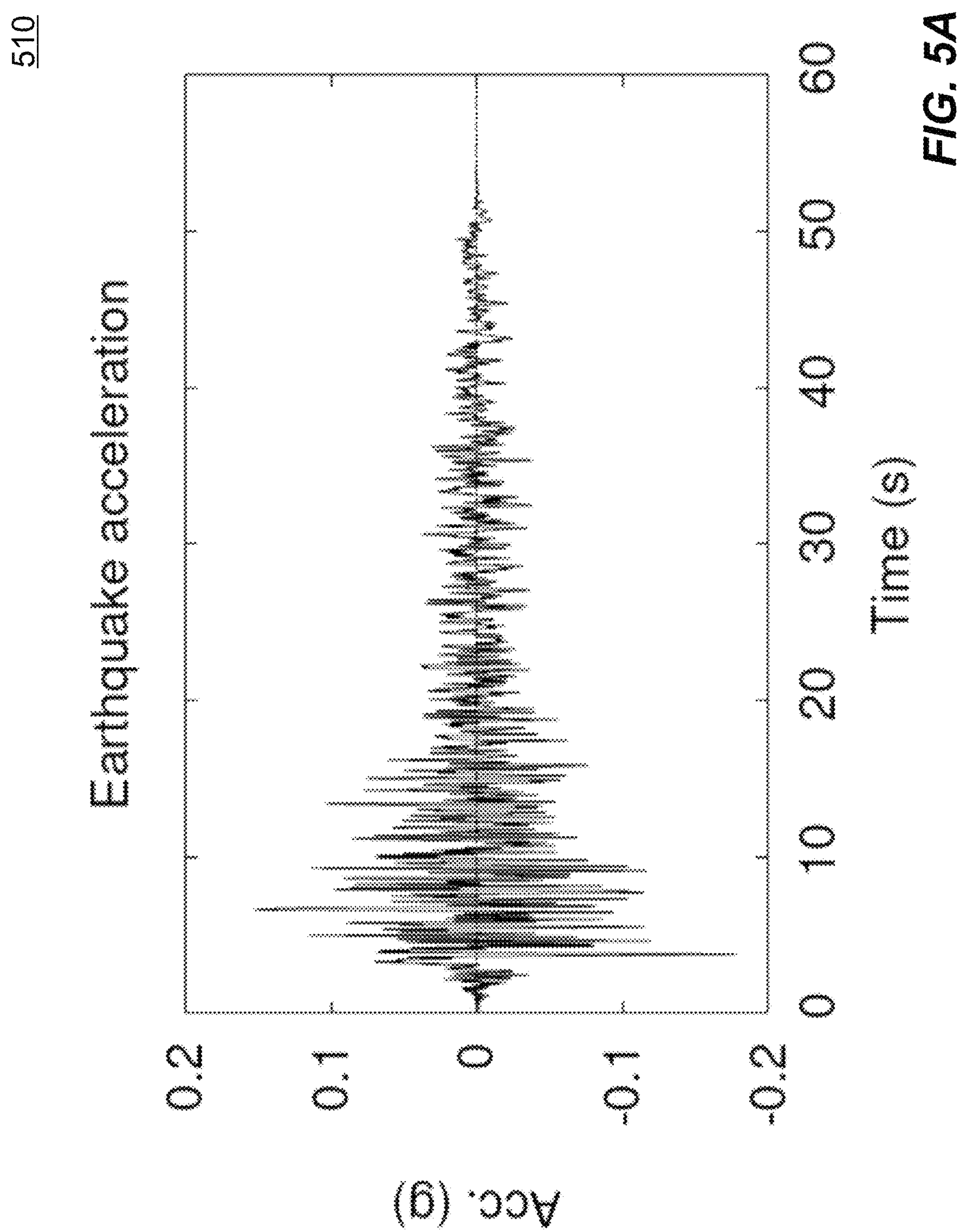
FIG. 5A is a diagram illustrating an example ground motion time history.
Figure 5B:
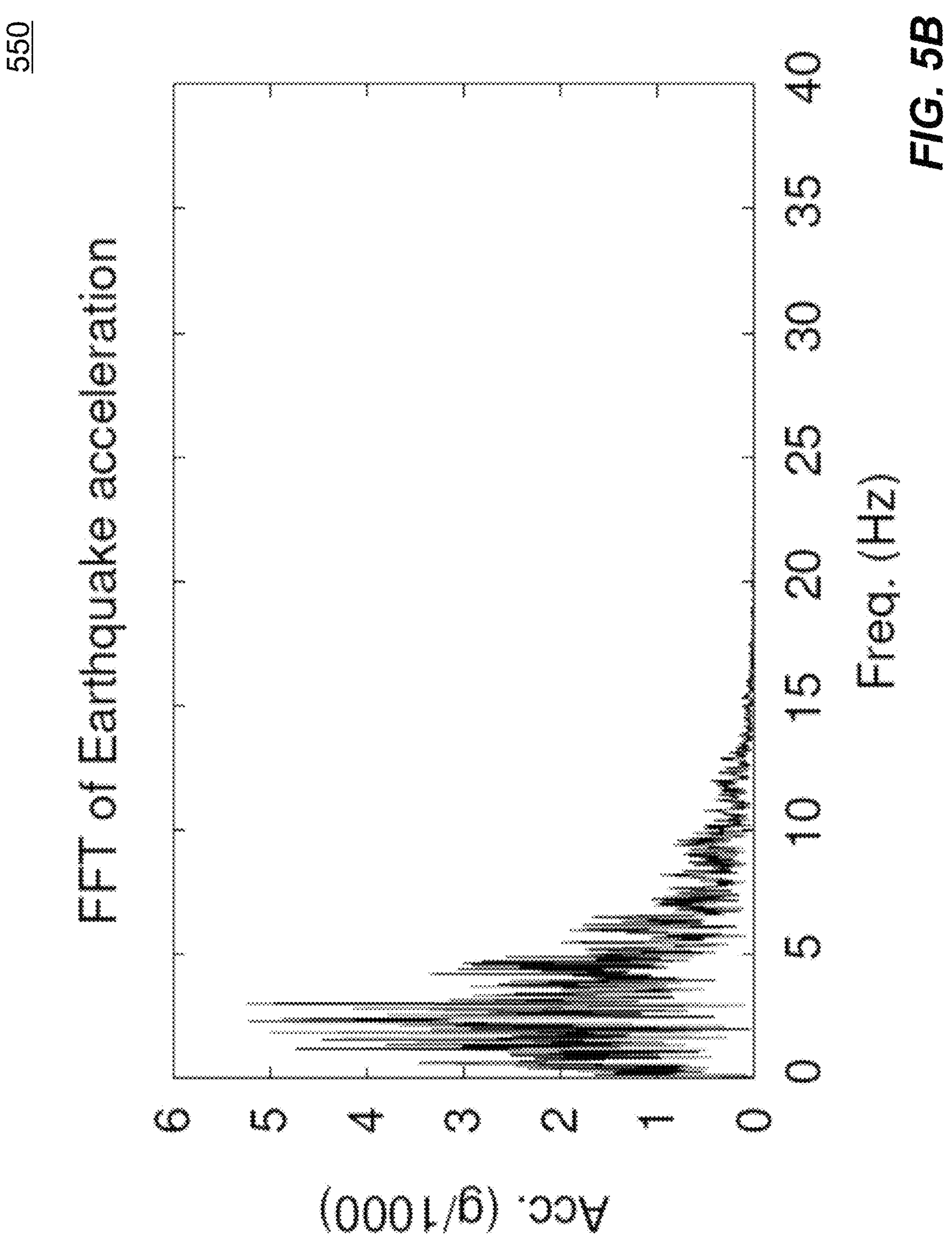
FIG. 5B is a diagram illustrating an example frequency domain ground motion.

FIG. 5A is a plot of accelerations versus time an example ground motion time history 510. Other types of ground motion time histories may be used, for example, displacements versus time, velocities versus time, etc. The ground motion time history is specified, measured or recorded typically at the top of the soil domain, but may also be specified, measured or recorded at some depth below the top. As an input record, the ground motion time history may be in forms of a look-up table containing accelerations with respective times. In one embodiment, the ground motion time history is provided in a regular time interval, for example, every tenth of a second. FIG. 5B shows a ground motion time history represented in a frequency domain as a graph 550 which can be generated from the ground motion time history via FFT. Frequency can be the inverse of ground motion wave period.

Figure 6:
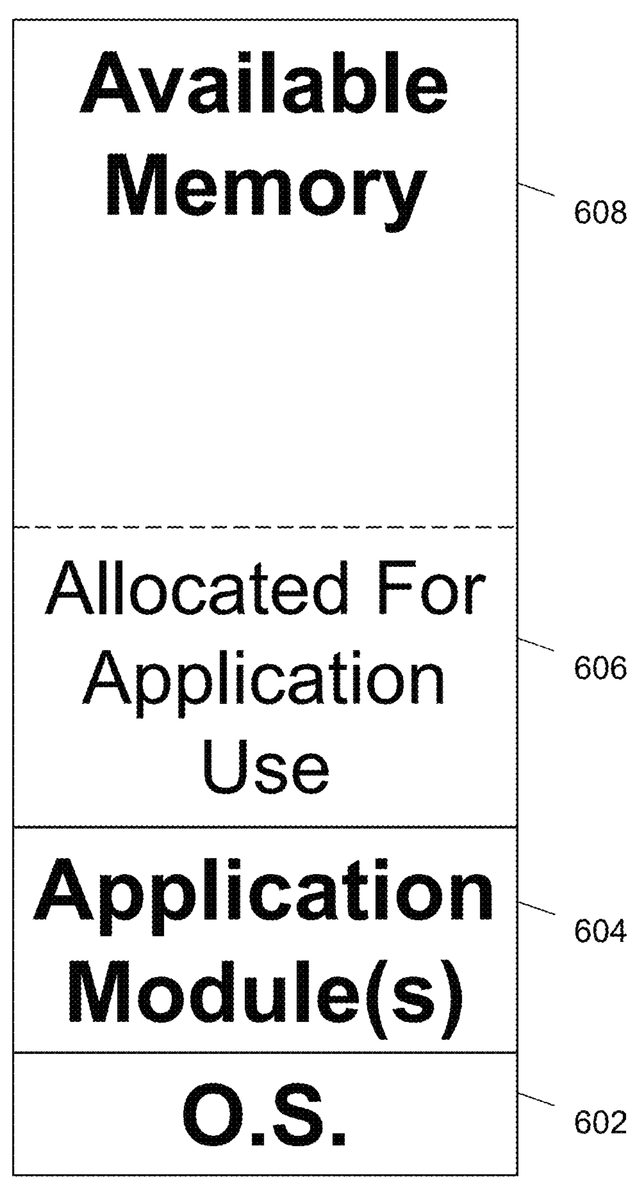
FIG. 6 is a schematic diagram showing an example data structure of a memory in a computer system.
Figure 14A:
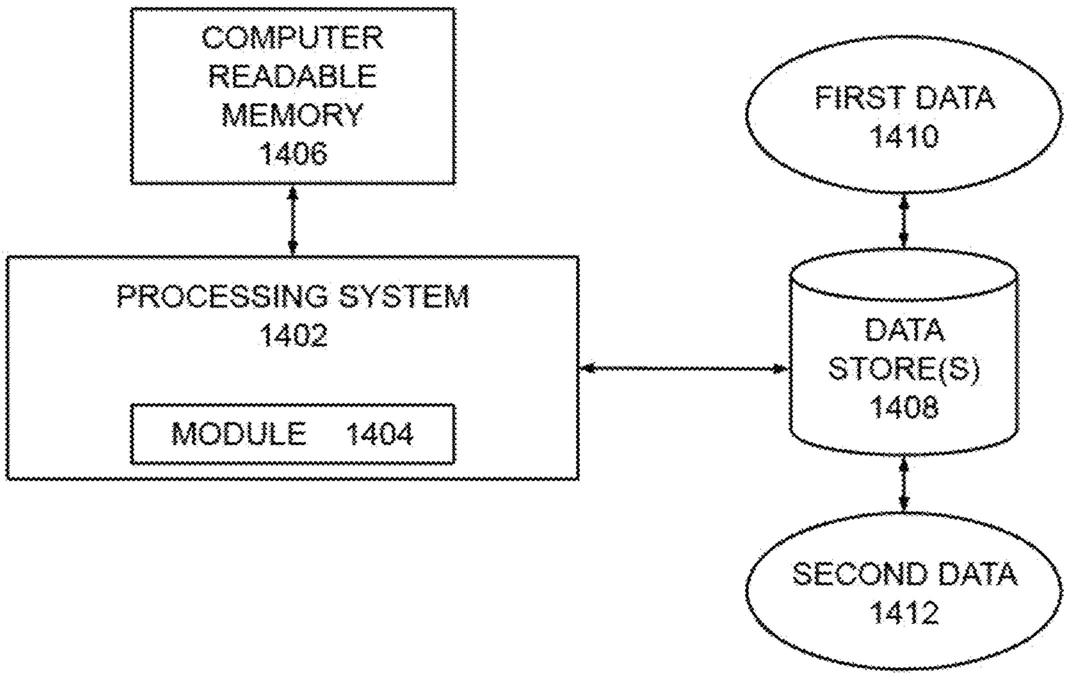
FIG. 14A is a block diagram showing an example system including a standalone computing architecture.
Figure 14B:
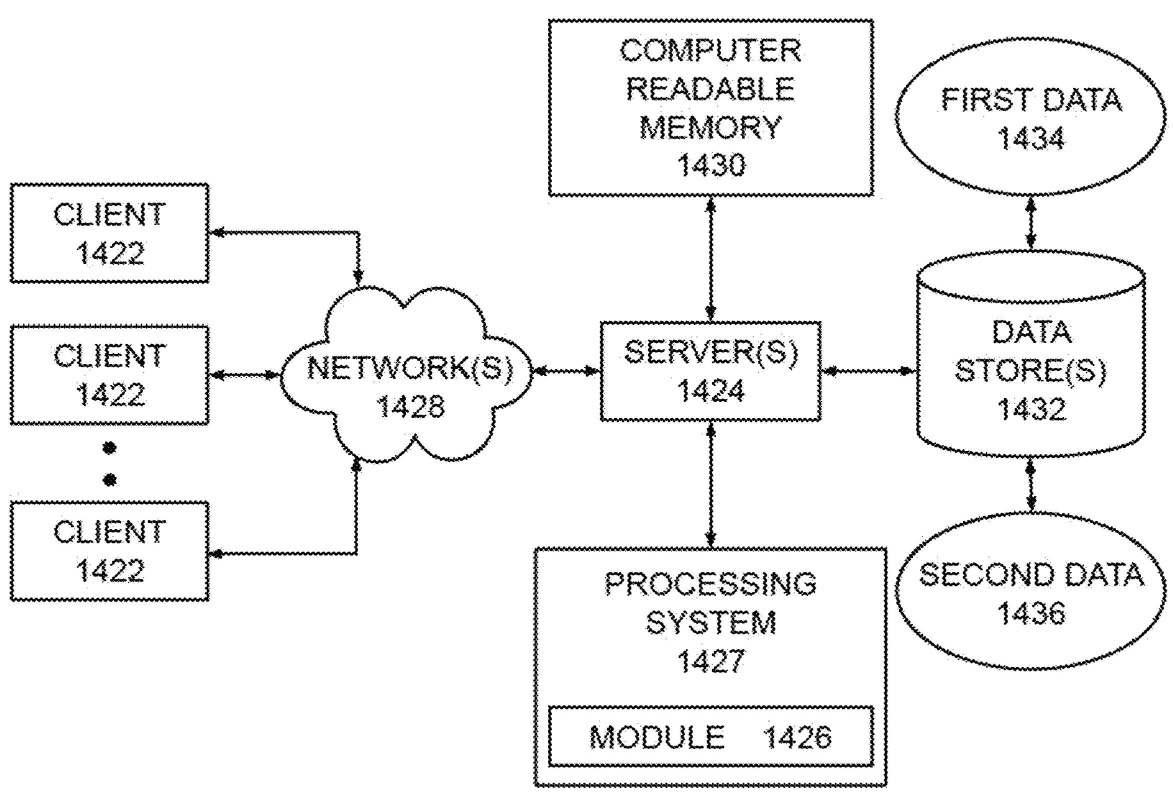
FIG. 14B is a block diagram showing an example system including a client-server computing architecture.

FIG. 6 depicts a schematic diagram of example data structure of a memory 600 in a computer system (e.g., computer systems 1400, 1420 in FIGS. 14A-14B). Memory 600 is shown to be loaded with an operation system (O.S.) 602 and one or more application modules (i.e., software) 604. The remaining memory is the available memory 608 during execution of a software. A portion of the available memory 608 can be allocated for application use 606. The available memory 608 is dynamic depending upon the computer's state during executing of a software.

FIG. 7 is a diagram showing an example single-column model 710 having a one-dimensional coordinate system x with the origin at the top end 712 of the single-column model 710. Ground motion time history $u_0(t)$ is shown at the top end 712. The calculated soil motion $U_{bot}(\omega)$ in frequency domain (i.e., deconvolved motion) are converted to time-domain shown at the bottom end of the single-column model 714.

Figure 8:
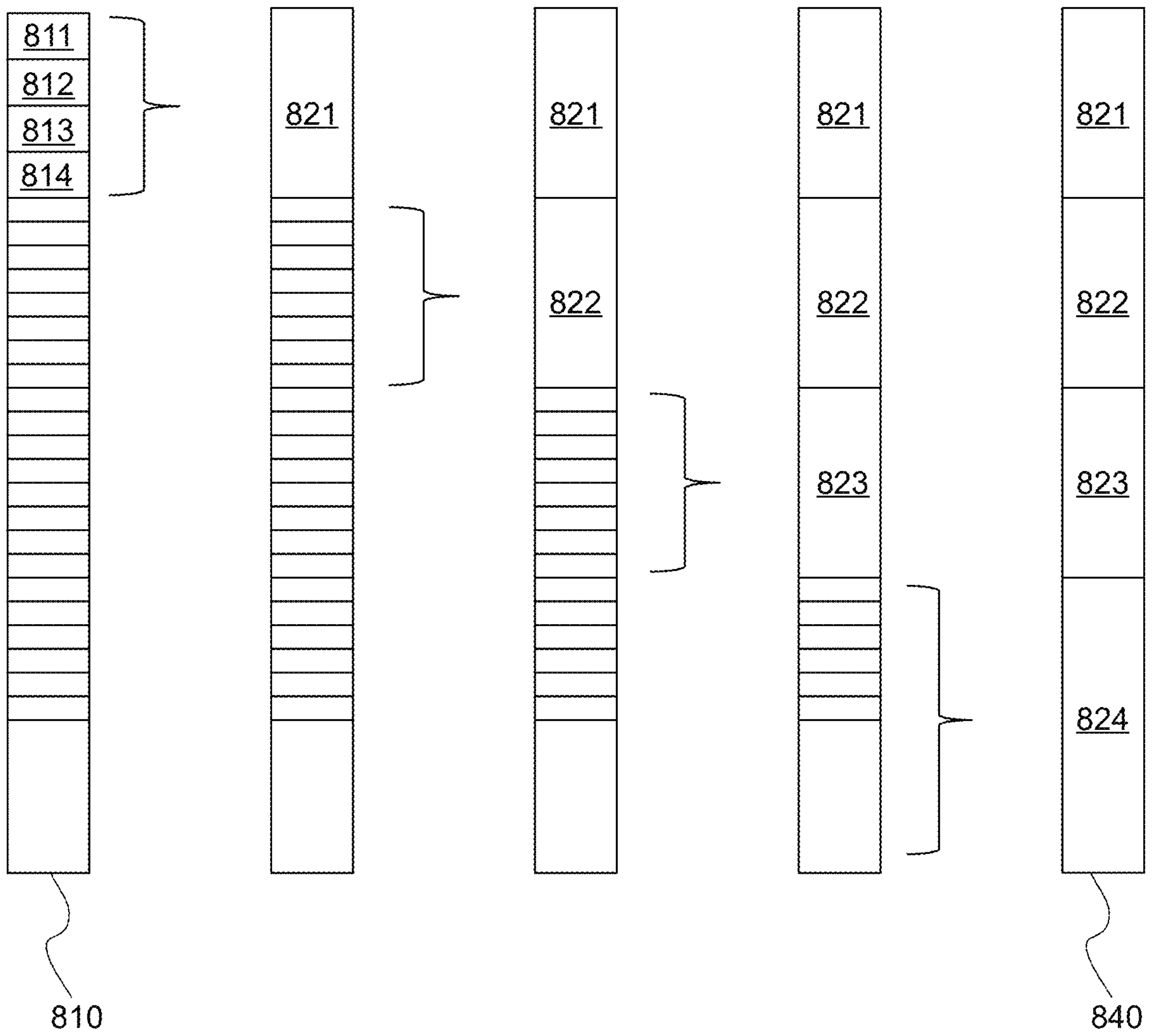
FIG. 8 is a schematic diagram illustrating an example sequence of updating a single-column model.
Figure 13A:
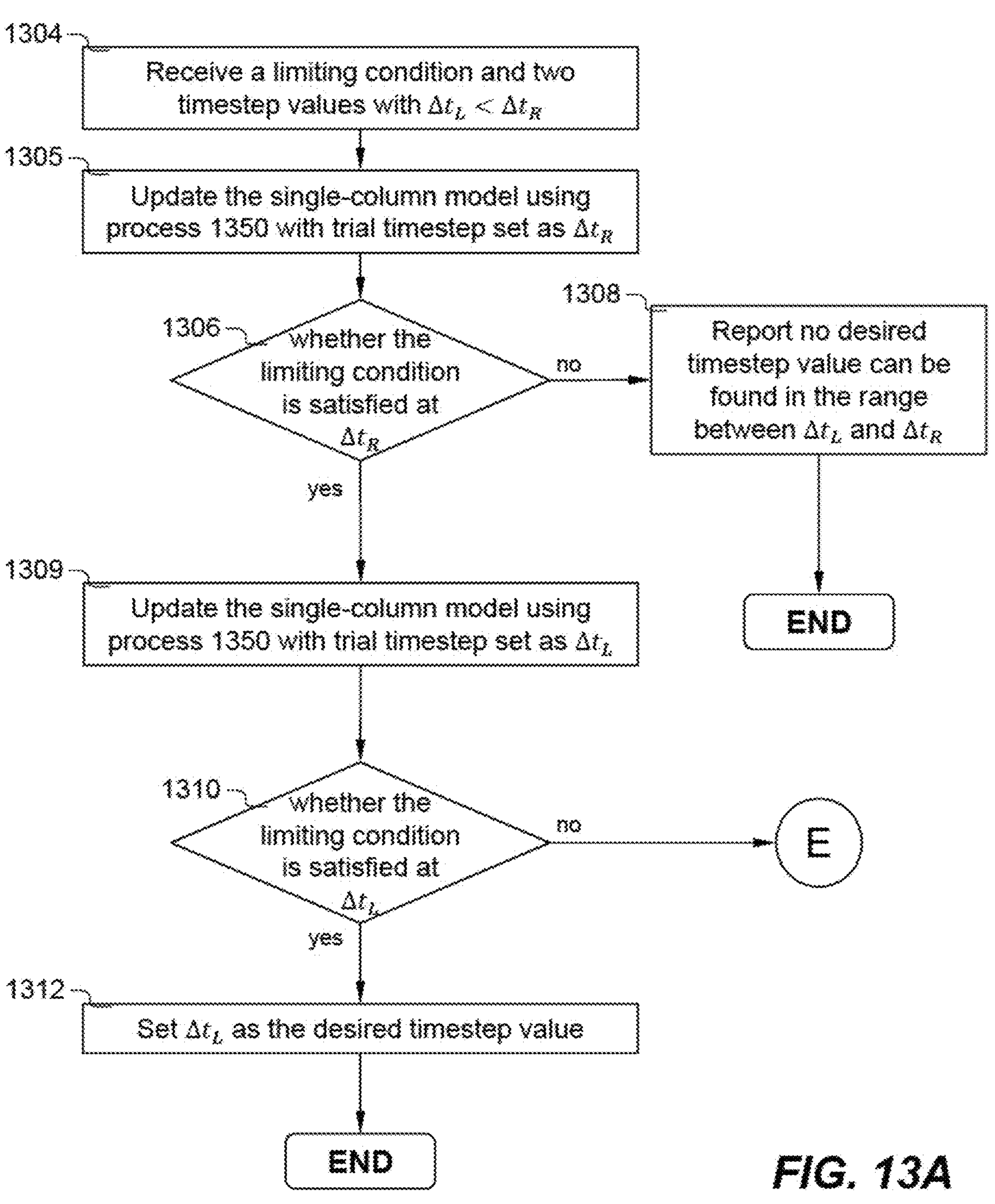
FIGS. 13A-13B collectively show a flow diagram illustrating an example process of determining a time interval that satisfies a limiting condition with updating the single-column model.
Figure 13B:
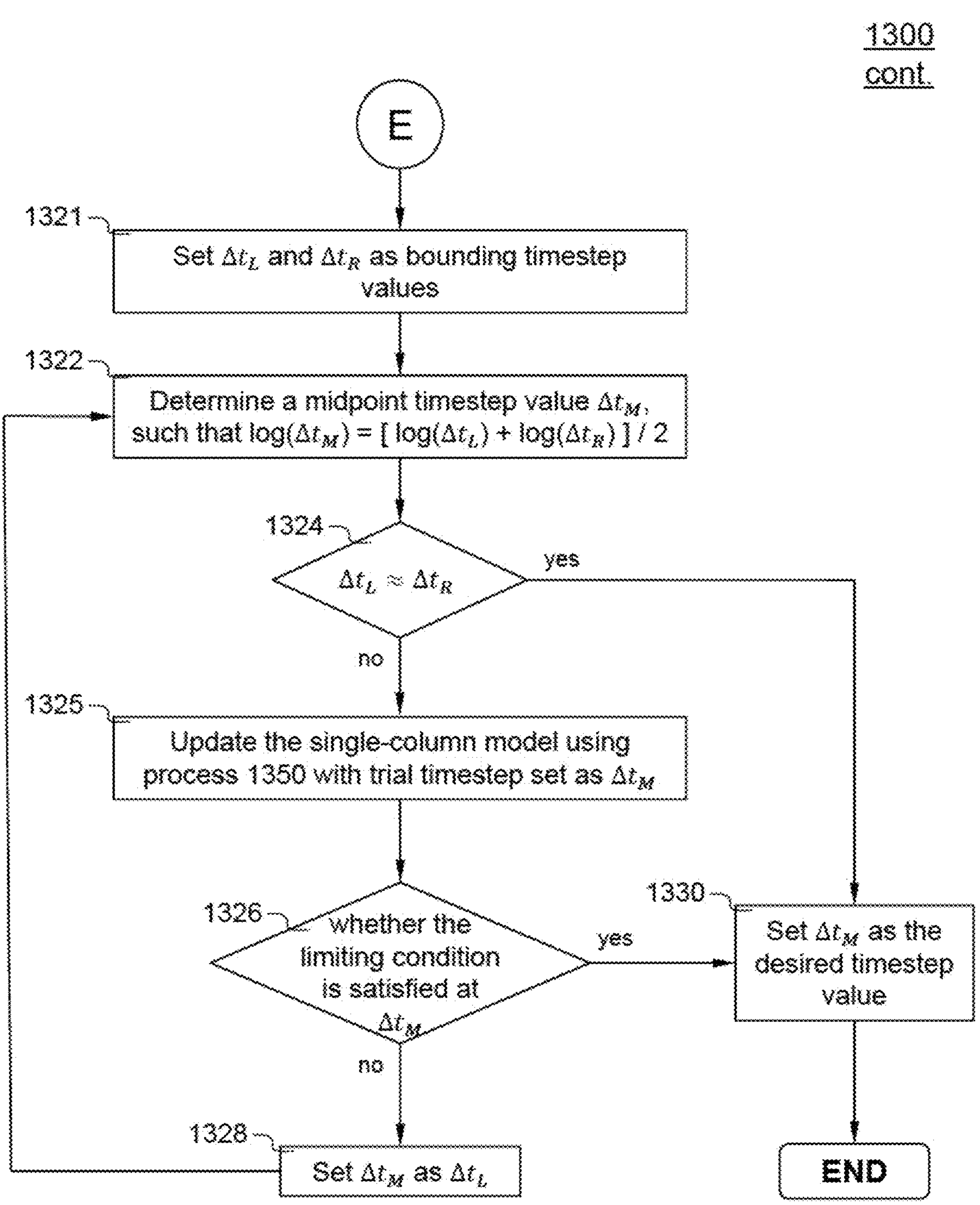

FIG. 8 is a schematic diagram showing an example single-column model 810 is updated/modified by merging elements in process 1300 of FIGS. 13A-13B. The single-column model 810 contains a number of elements with many small ones.

In this example, process 1300 starts from the top of the single-column model 810, the first current element 811 is merged with next three elements 812, 813 and 814 to element 821. At the end of process 1300, the updated single-column model 840 contains only four elements 821-824.

Figure 9A:
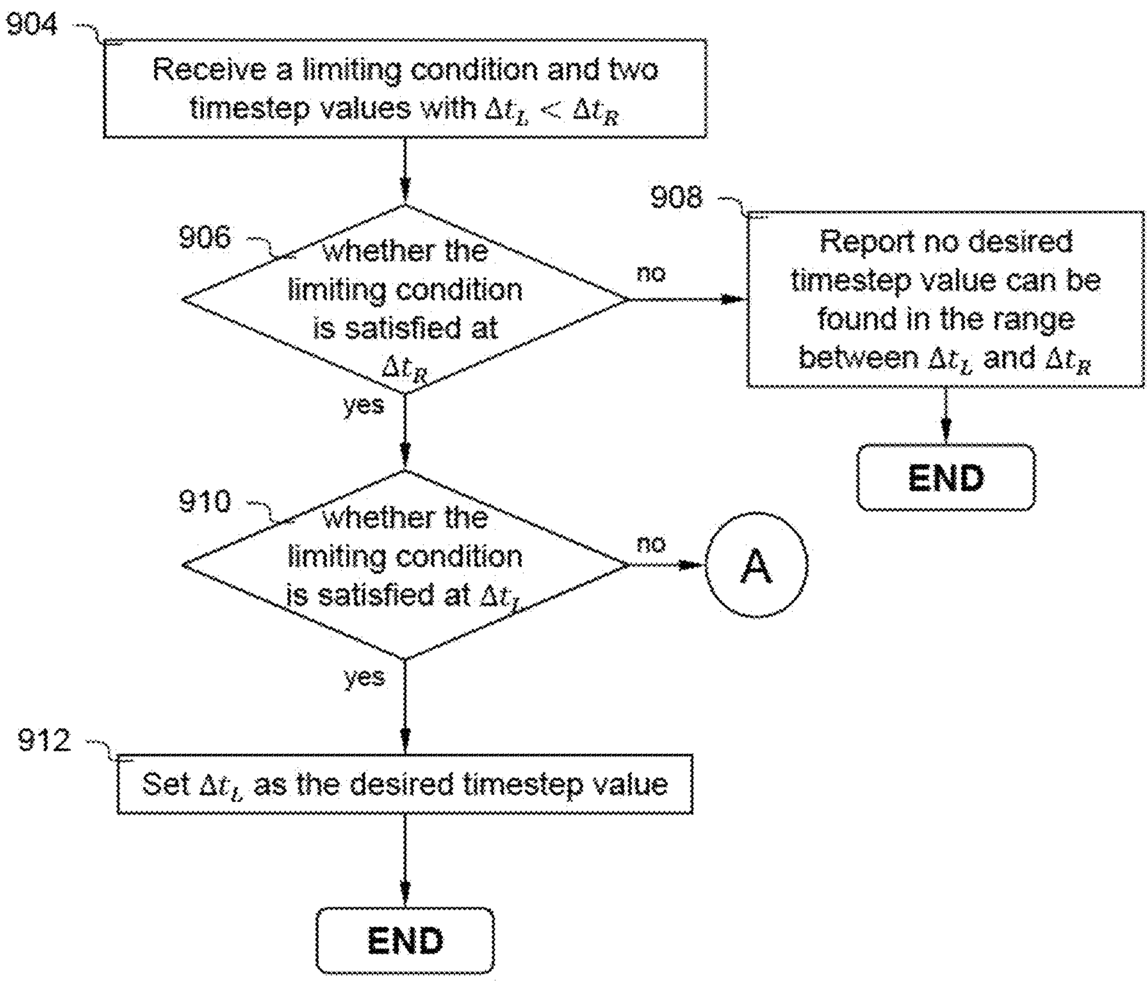
FIGS. 9A-9B collectively show a flow diagram illustrating an example process of determining a time interval that satisfies a limiting condition.
Figure 9B:
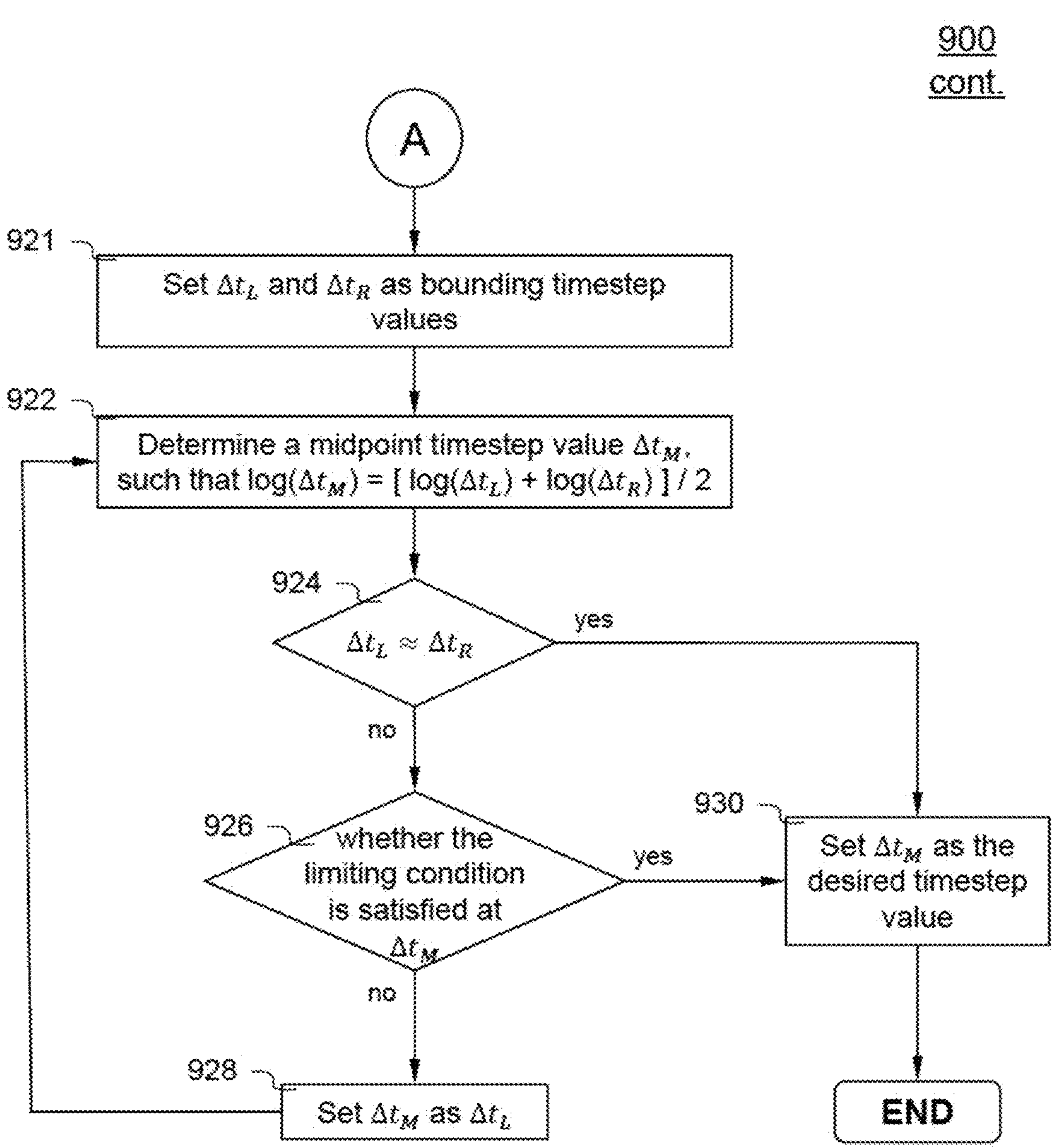

FIGS. 9A-9B collectively show a flow diagram illustrating an example process 900 of determining a desired time interval or timestep value ($\Delta t$) subject to a limiting condition or limitation.

In order to carry out process 900, the following rule are established for two timestep values having a relationship $\Delta t_1 < \Delta t_2$. The governing rule is as follows:

if a limiting condition is satisfied for $\Delta t_1$, then it is also satisfied for $\Delta t_2$;

else if the limiting condition is not satisfied for $\Delta t_2$, then it is not satisfied for $\Delta t_1$.

Process 900 starts at action 904 by receiving a limiting condition and two timestep values $\Delta t_L$, $\Delta t_R$ with $\Delta t_L < \Delta t_R$ in a computer system (e.g., computer systems 1400, 1420 in FIGS. 14A-14B). At decision 906, it is determined whether the limiting condition is satisfied at $\Delta t_R$. If not, process 900 follows the 'no' branch to action 908 to report that no desired timestep value can be found in the range between $\Delta t_L$ and $\Delta t_R$. Process 900 ends thereafter.

If decision 906 is true, process 900 moves to decision 910 to determine if the limiting condition is satisfied at $\Delta t_L$. If true, process 900 follows the 'yes' branch to action 912 to set $\Delta t_L$ as the desired timestep value. Otherwise, process 900 moves to action 921, in which $\Delta t_L$ and $\Delta t_R$ are set as two bounding timestep values. Then, at action 922, a midpoint timestep value $\Delta t_M$ is calculated or determined using the following formula:

$$\log(\Delta t_M) = [\log(\Delta t_L) + \log(\Delta t_R)]/2$$

Next, at decision 924, it is determined whether $\Delta t_L \approx \Delta t_R$ (i.e., $\Delta t_L$ and $\Delta t_R$ are within a predefined threshold or tolerance). If true, process 900 follows the 'yes' branch to action 930 to set $\Delta t_M$ as the desired timestep value. Process 900 ends thereafter.

Otherwise process 900 follows the 'no' branch to decision 926. It is determined whether the limiting condition is satisfied at $\Delta t_M$. If not, process 900 follows the 'no' branch to action 928 to set $\Delta t_M$ as $\Delta t_L$. Process 900 goes back to action 922 to repeat the above-described actions/decision. If decision 926 is true, process 900 follows the 'yes' branch to action 930 to set $\Delta t_M$ as the desired timestep value. Process 900 ends thereafter.

Figure 10A:
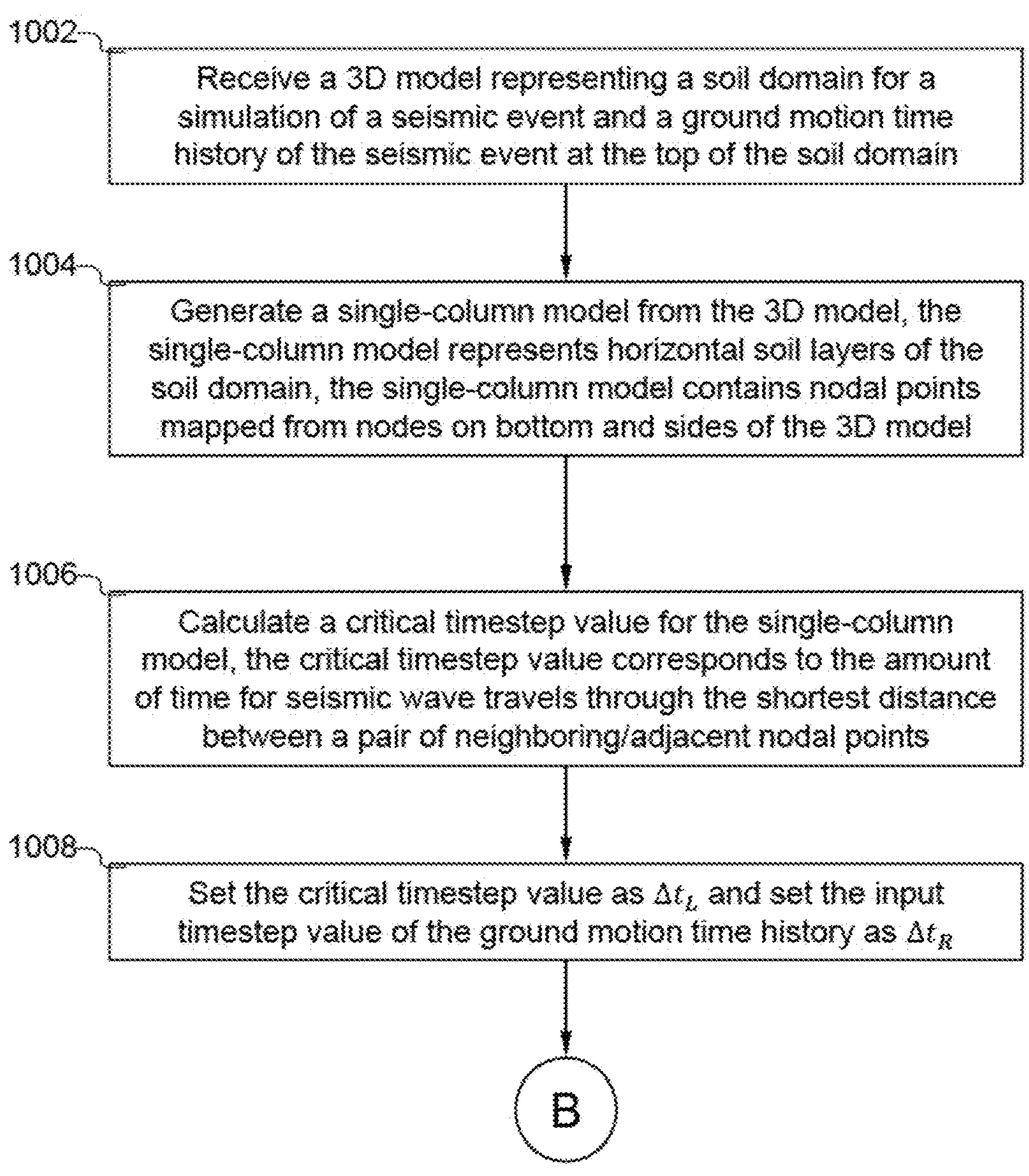
FIGS. 10A-10B collectively show a flow diagram illustrating an example process of simulating a seismic soil-structure interaction.
Figure 10B:
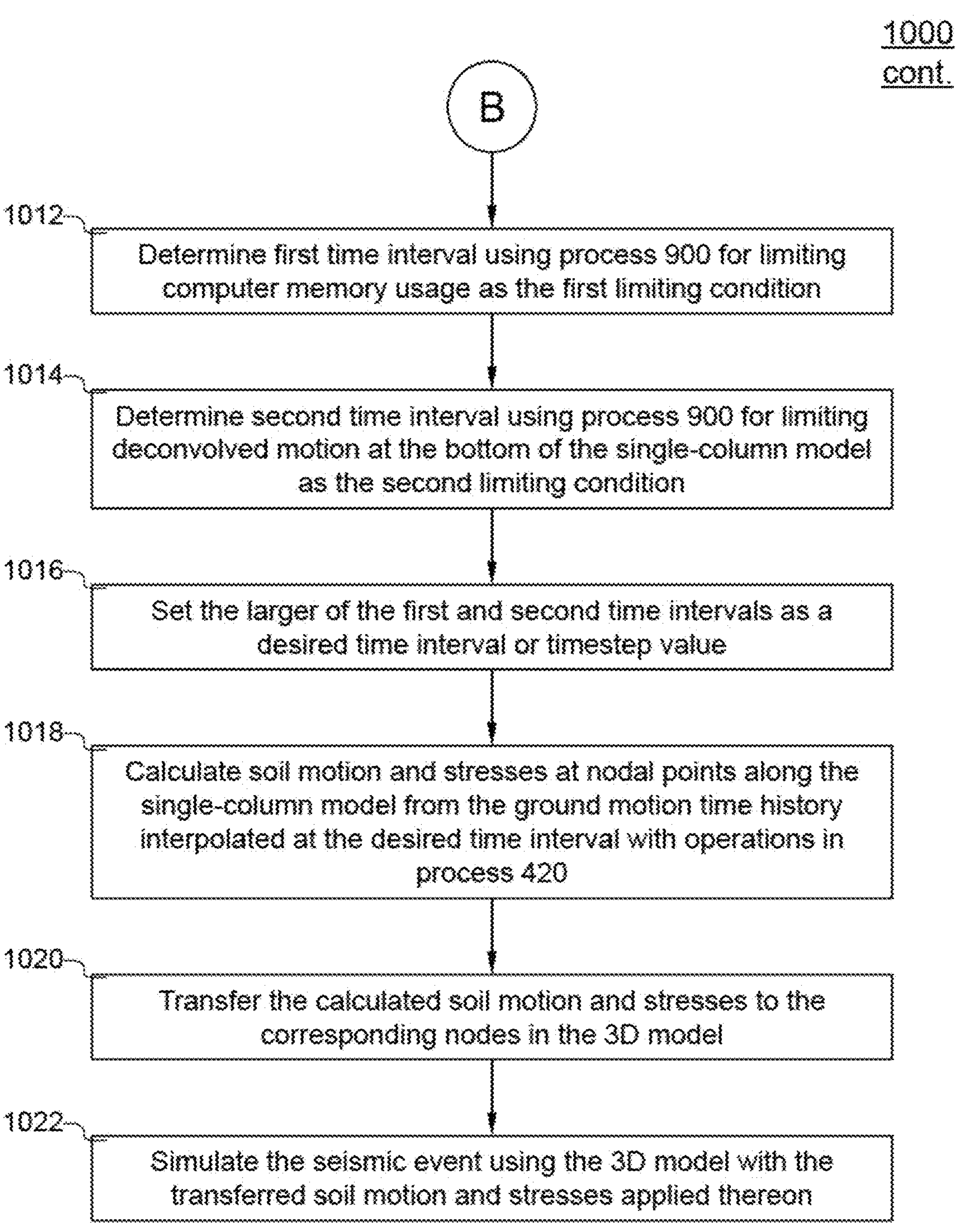

Referring now to FIGS. 10A-10B, a flow diagram is illustrated for an example process 1000 of simulating a seismic soil-structure interaction. Process 1000 starts at action 1002 by receiving a three-dimensional (3D) model representing a soil domain for a simulation of a seismic event in a computer system (e.g., computer systems 1400, 1420 in FIGS. 14A-14B). Also received is a ground motion time history at the top of the soil domain. Then, at action 1004, a single-column model (e.g., single-column model 710 shown in FIG. 7) is generated from the 3D model. One example of such generation is shown in FIG. 3. The single-column model represents horizontal soil layers of the soil domain in the depth or vertical direction. The single-column model contains nodal points mapped from nodes on the bottom and sides of the 3D model. Details of generating a single-column model is shown an example process 400 in FIG. 4A.

At action 1006, a critical timestep value for the single-column model is calculated. The critical timestep value corresponds to the amount of time for seismic wave travels through the shortest distance between a pair of neighboring/adjacent nodal points. Then, at action 1008, the critical timestep value is set as $\Delta t_L$ and the timestep value of the input ground motion time history is set as $\Delta t_R$ to determine a desired time interval.

A first time interval is determined, at action 1012, using process 900 for limiting computer memory usage as the first limiting condition. In one embodiment, a quarter (¼) of the available memory is specified for the first limiting condition. The first limiting condition is to prevent the time interval to be too small (i.e., too many points for performing FFT), which leads to memory requirements far surpassing available memory.

A second time interval is determined, at action 1014, using process 900 for limiting deconvolved motion at the bottom of the single-column model as the second limiting condition. In one embodiment, the deconvolved soil motion is limited to 20 times of the input ground motion history at the top. The deconvolved soil motion can be unrealistically large in the deconvolution process 420 due to a term $$e^{i\pi\left(\frac{h/c}{\Delta t}\right)},$$

where h is the height of element in the single-column model, C is complex seismic wave speed.

At action 1016, the larger of the first and second time intervals is set as a desired time interval or timestep value, which is used for interpolating the input ground motion time history to calculate/compute soil motion and stresses at nodal points along the single-column model using the operations in the deconvolution process 420 in action 1018. In other words, the time interval or timestep value is used for the sampling rate to perform FFT on the input ground motion time history. At action 1020, the calculated/computed soil motion and stresses are transferred to the corresponding nodes in the 3D model. A simulation of the seismic event is conducted based on the 3D model with the transferred soil motion and stresses applied thereon at action 1022. The simulation is to estimate/predict/determine the soil-structure interaction, which can be used for designing/building the structure to survive the seismic event.

Figure 11A:
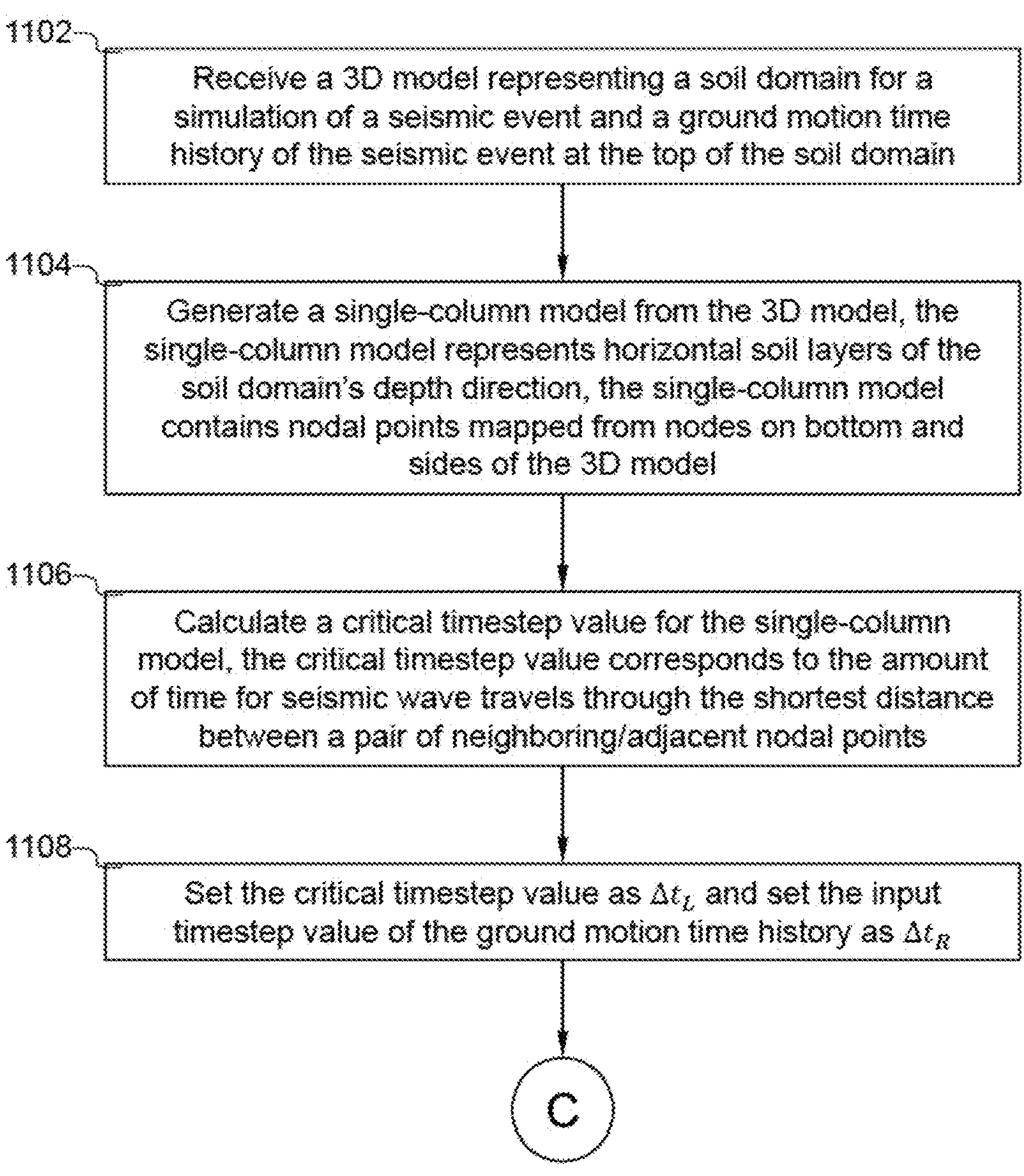
FIGS. 11A-11B collectively show a flow diagram illustrating alternative example process of simulating a seismic soil-structure interaction using implicit FEA.
Figure 11B:
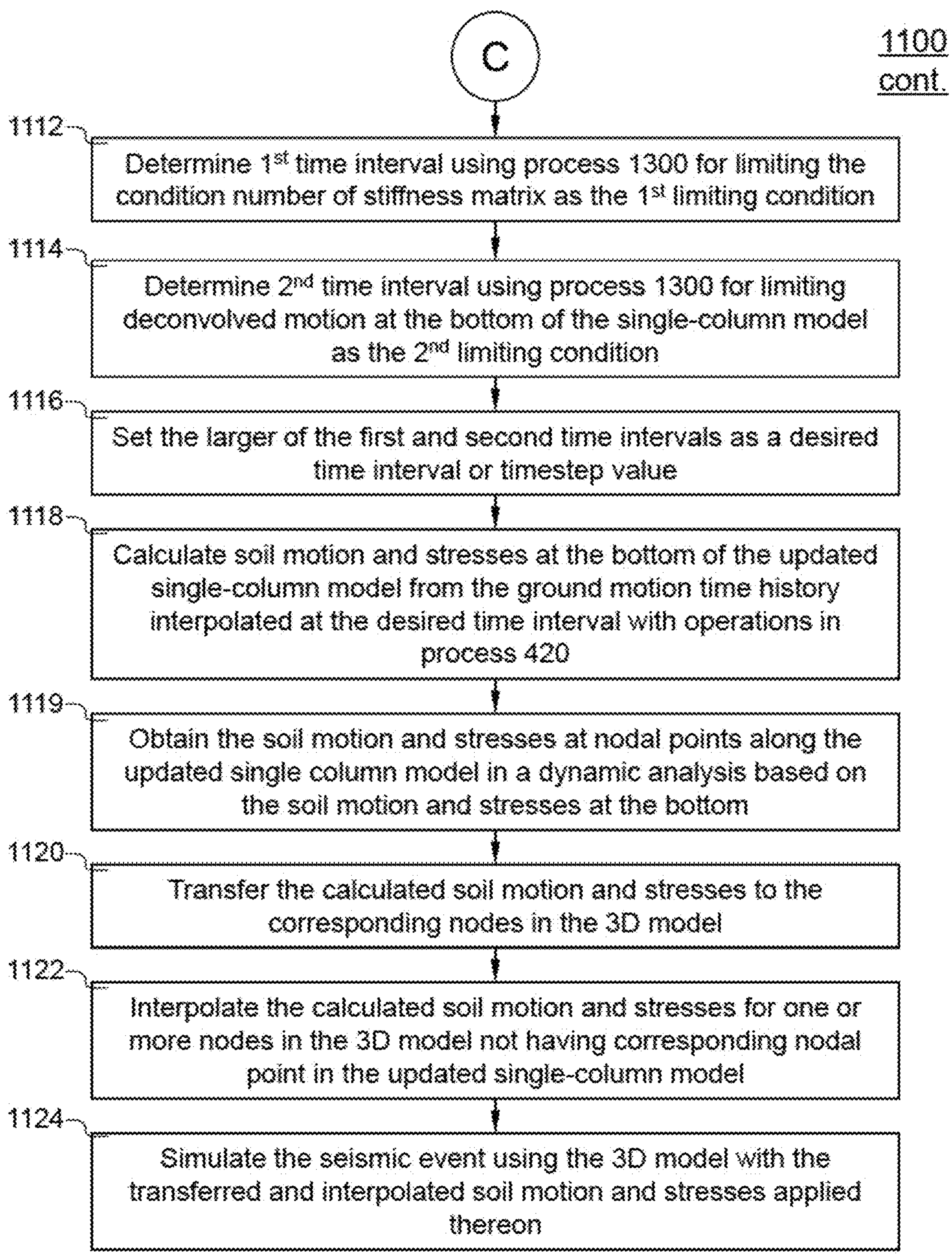

FIGS. 11A-11B collectively is a flow diagram illustrating an example process 1100 of simulating a seismic soil-structure interaction using implicit FEA. Process 1100 includes updating of the single-column model during the determination actions of a desired time interval or timestep value using process 1300.

Process 1100 starts at action 1102 by receiving a three-dimensional (3D) model representing a soil domain for a simulation of a seismic event in a computer system (e.g., computer systems 1400, 1420 in FIGS. 14A-14B). Also received is a ground motion time history at the top of the soil domain. Then, at action 1104, a single-column model (e.g., single-column model 710 shown in FIG. 7) is generated from the 3D model. One example of such generation is shown in FIG. 3. The single-column model represents horizontal soil layers of the soil domain in the depth or vertical direction. The single-column model contains nodal points mapped from nodes on the bottom and sides of the 3D model. Details of generating a single-column model is shown an example process 400 in FIG. 4A.

At action 1106, a critical timestep value for the single-column model is calculated. The critical timestep value corresponds to the amount of time for seismic wave travels through the shortest distance between a pair of neighboring/adjacent nodal points. Then, at action 1108, the critical timestep value is set as $\Delta t_L$ and the timestep value of the input ground motion time history is set as $\Delta t_R$ to determine a desired time interval.

A first time interval is determined, at action 1112, using process 1300 for limiting the condition number of the stiffness matrix of the single-column model as the first limiting condition. At action 1114, a second time interval is determined using process 1300 for limiting deconvolved motion at the bottom of the single-column model as the second limiting condition. Single-column model is updated a number of times in process 1300.

At action 1116, the larger of the first and second time intervals is set as a desired time interval or timestep value. In other words, the time interval or timestep value is used for the sampling rate to perform FFT on the input ground motion time history. At action 1118, soil motion and stresses at the bottom or base of the updated single-column model are calculated/computed from the ground motion time history interpolated at the desired time interval with operations in process 420. Next, at action 1119, soil motion and stresses at nodal points along the updated single-column model are obtained in a dynamic analysis based on the soil motion and stresses at the bottom of the single-column model.

At action 1120, the calculated/computed soil motion and stresses are transferred to the corresponding nodes in the 3D model. For one or more nodes in the 3D model not having corresponding nodal point in the updated single-column model, the soil motion and stresses can be interpolated at action 1122.

A simulation of the seismic event is conducted based on the 3D model with the transferred and interpolated soil motion and stresses applied thereon at action 1124. The simulation is to estimate/predict/determine the soil-structure interaction, which can be used for designing/building the structure to survive the seismic event.

Figure 12A:
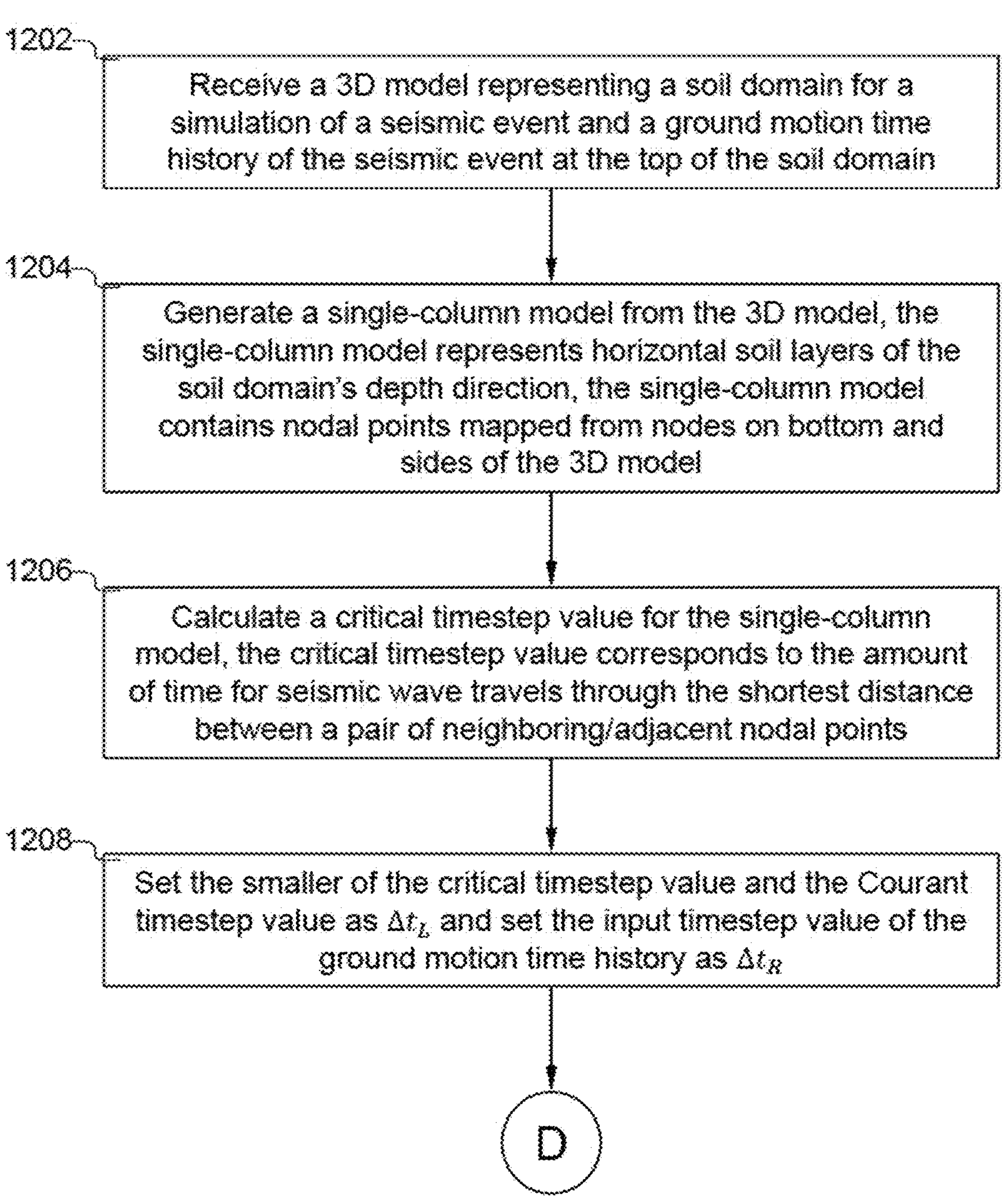
FIGS. 12A-12B collectively show a flow diagram illustrating another alternative example process of simulating a seismic soil-structure interaction using explicit FEA.
Figure 12B:
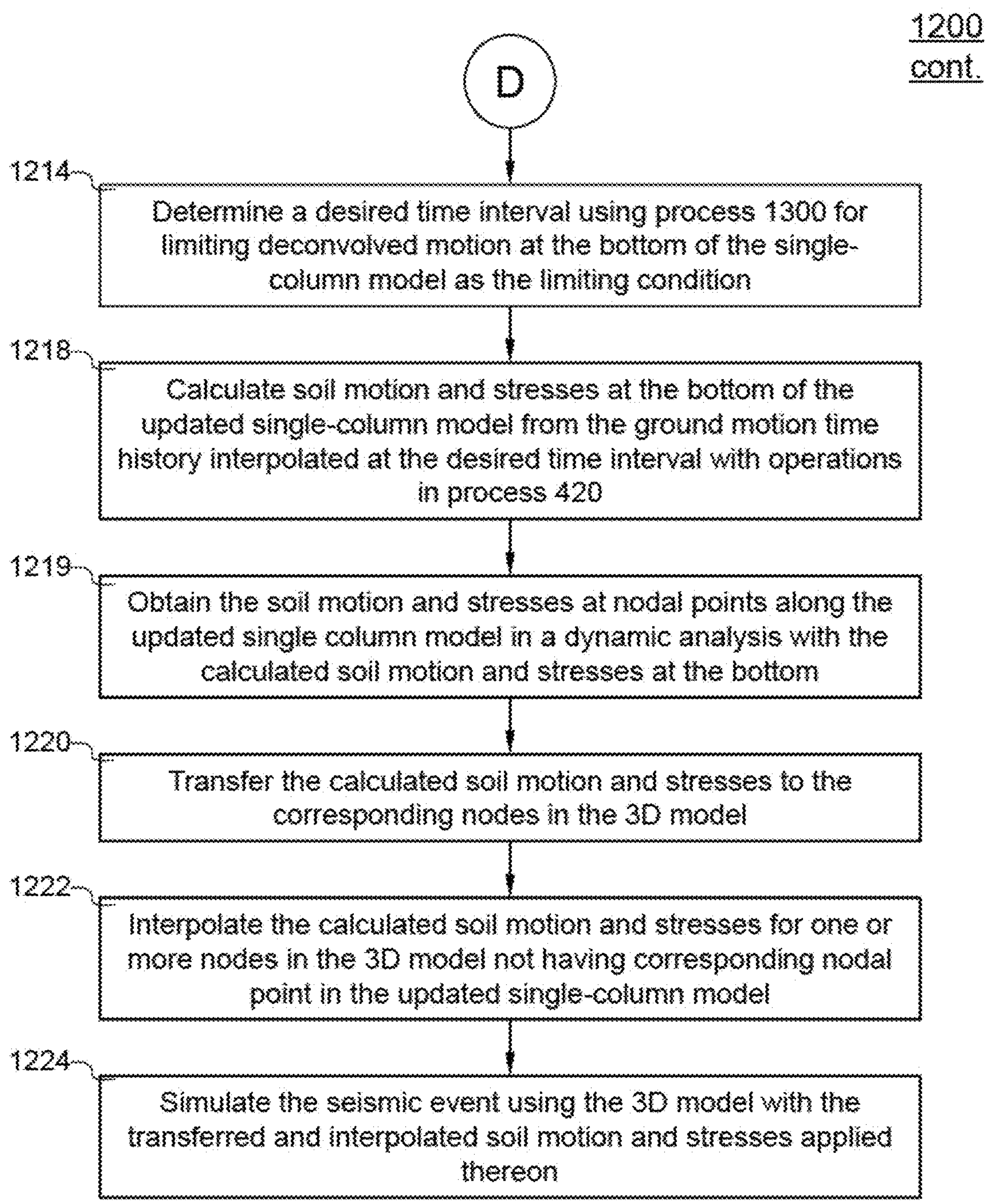

FIGS. 12A-12B collectively is a flow diagram illustrating an example process 1200 of simulating a seismic soil-structure interaction using explicit FEA. Process 1200 is substantially similar to process 1100. Process 1200 includes updating of the single-column model during the determination actions of a desired time interval or timestep value using process 1300.

Process 1200 starts at action 1202 by receiving a three-dimensional (3D) model representing a soil domain for a simulation of a seismic event in a computer system (e.g., computer systems 1400, 1420 in FIGS. 14A-14B). Also received is a ground motion time history at the top of the soil domain. Then, at action 1204, a single-column model (e.g., single-column model 710 shown in FIG. 7) is generated from the 3D model. One example of such generation is shown in FIG. 3. The single-column model represents horizontal soil layers of the soil domain in the depth or vertical direction. The single-column model contains nodal points mapped from nodes on the bottom and sides of the 3D model. Details of generating a single-column model is shown an example process 400 in FIG. 4A.

At action 1206, a critical timestep value for the single-column model is calculated. The critical timestep value corresponds to the amount of time for seismic wave travels through the shortest distance between a pair of neighboring/adjacent nodal points. Then, at action 1208, the smaller of the critical timestep value and the Courant timestep value is set as $\Delta t_L$. The timestep value of the input ground motion time history is set as $\Delta t_R$ to determine a desired time interval.

A desired time interval is determined, at action 1214, using process 1300 for limiting deconvolved motion at the bottom of the single-column model as the limiting condition.

Single-column model is updated a number of times in process 1300. The desired time interval is used for the sampling rate to perform FFT on the input ground motion time history.

At action 1218, soil motion and stresses at the bottom or base of the updated single-column model are calculated/computed from the ground motion time history interpolated at the desired time interval with operations in process 420. Next, at action 1219, soil motion and stresses at nodal points along the updated single-column model are obtained in a dynamic analysis based on the soil motion and stresses at the bottom of the single-column model.

At action 1220, the calculated/computed soil motion and stresses are transferred to the corresponding nodes in the 3D model. For one or more nodes in the 3D model not having corresponding nodal point in the updated single-column model, the soil motion and stresses can be interpolated at action 1222.

A simulation of the seismic event is conducted based on the 3D model with the transferred and interpolated soil motion and stresses applied thereon at action 1224. The simulation is to estimate/predict/determine the soil-structure interaction, which can be used for designing/building the structure to survive the seismic event.

FIGS. 13A-13B collectively show a flow diagram illustrating an example process 1300 of determining a time interval that satisfies a limiting condition with updating the single-column model. Process 1300 is substantially similar to process 900 except including updating of the single-column model at each decision for evaluating the limiting condition. The governing rule is the same as the one used in process 900.

Process 1300 starts at action 1304 by receiving a limiting condition and two timestep values $\Delta t_L$, $\Delta t_R$ with $\Delta t_L < \Delta t_R$ in a computer system (e.g., computer systems 1400, 1420 in FIGS. 14A-14B). Next, at action 1305, the single-column model is updated using process 1350 shown in FIG. 13C with the trial timestep set as $\Delta t_R$. At decision 1306, it is determined whether the limiting condition is satisfied at $\Delta t_R$. If not, process 1300 follows the 'no' branch to action 1308 to report that no desired timestep value can be found in the range between $\Delta t_L$ and $\Delta t_R$. Process 1300 ends thereafter.

If decision 1306 is true, process 1300 moves to action 1309. The single-column model is updated again using process 1300 with the trial timestep set as $\Delta t_L$. Next, at decision 1310, it is determined if the limiting condition is satisfied at $\Delta t_L$. If true, process 1300 follows the 'yes' branch to action 1312 to set $\Delta t_L$ as the desired timestep value. Otherwise, process 1300 moves to action 1321, in which $\Delta t_L$ and $\Delta t_R$ are set as two bounding timestep values. Then, at action 1322, a midpoint timestep value $\Delta t_M$ is calculated or determined using the following formula:

$$\log(\Delta t_M) = [\log(\Delta t_L) + \log(\Delta t_R)]/2$$

Next, at decision 1324, it is determined whether $\Delta t_L \approx \Delta t_R$ (i.e., $\Delta t_L$ and $\Delta t_R$ are within a predefined threshold or tolerance). If true, process 1300 follows the 'yes' branch to action 930 to set $\Delta t_M$ as the desired timestep value. Process 1300 ends thereafter.

Otherwise process 1300 follows the 'no' branch to action 1325. The single-column model is updated again using process 1300 with the trial timestep set as action 1309. The single-column model is updated again using process 1300 with the trial timestep set as $\Delta t_M$. Next, at decision 1326, it is determined whether the limiting condition is satisfied at $\Delta t_M$. If not, process 1300 follows the 'no' branch to action 1328 to set $\Delta t_M$ as $\Delta t_L$. Process 1300 goes back to action 1322 to repeat the above described actions/decision. If decision 1326 is true, process 1300 follows the 'yes' branch to action 1330 to set $\Delta t_M$ as the desired timestep value. Process 1300 ends thereafter.

Figure 13C:
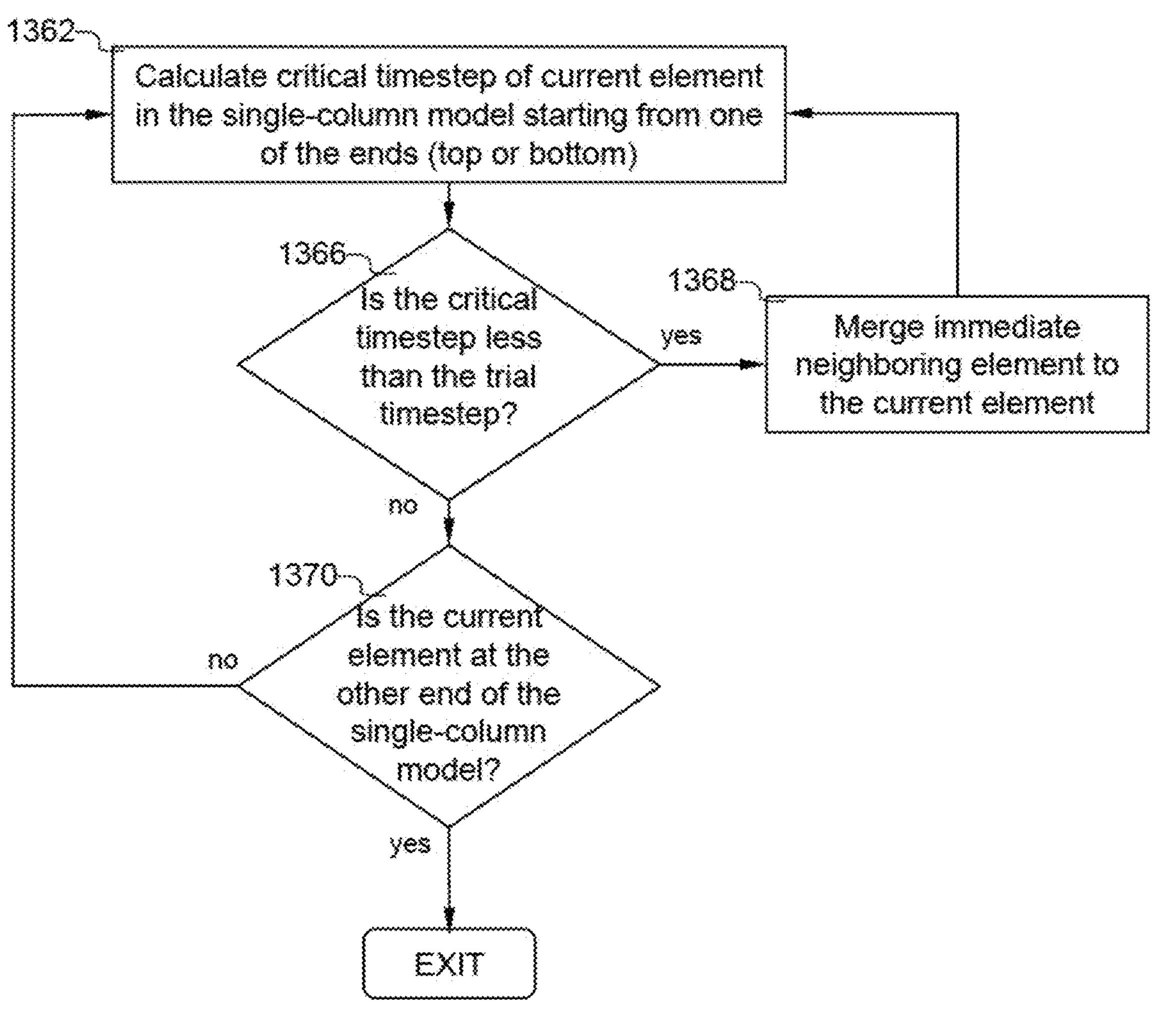
FIG. 13C is a flow diagram illustrating an example process of updating the single-column model.

FIG. 13C is a flow diagram illustrating an example process 1350 of updating the single-column model. Process 1350 starts at action 1362 by calculating critical timestep value of current element in the single-column model starting from one of the ends (i.e., top or bottom). Next at decision 1366, it is determined whether the critical timestep value is less than the trial timestep vale. If true, process 1350 follows the 'yes' branch to action 1368 to update the single-column model by merging immediate neighboring element to the current element. The immediate neighboring element is the next element to be processed in action 1362.

If decision 1366 is false, process 1350 moves to decision 1370 to determine if the current element at the other end of the single-column model. If not, process 1350 moves back to action 1362 to process next element as the current element. Otherwise, process 1350 ends or exits back to process 1300.

The subject matter described herein may be implemented using any suitable processing system with any suitable combination of hardware, software and/or firmware, such as described below with reference to the non-limiting examples shown in FIGS. 14A-14D.

FIG. 14A depicts an example system 1400 that includes a standalone computer architecture where a processing system 1402 (e.g., one or more computer processors) includes a module 1404 (e.g., software module stored in memory) being executed on it. The processing system 1402 has access to a non-transitory computer-readable memory 1406 in addition to one or more data stores 1408. The one or more data stores 1408 may contain first data 1410 as well as second data 1412.

FIG. 14B depicts another example system 1420 that includes a client-server architecture. One or more clients 1422 (e.g., user personal computer, workstation, etc.) accesses one or more servers 1424 executing computer instructions of a module 1426 (e.g., software module stored in memory) on a processing system 1427 via one or more networks 1428. The one or more servers 1424 may access a non-transitory computer readable memory 1430 as well as one or more data stores 1432. The one or more data stores 1432 may contain first data 1434 as well as second data 1436.

Figure 14C:
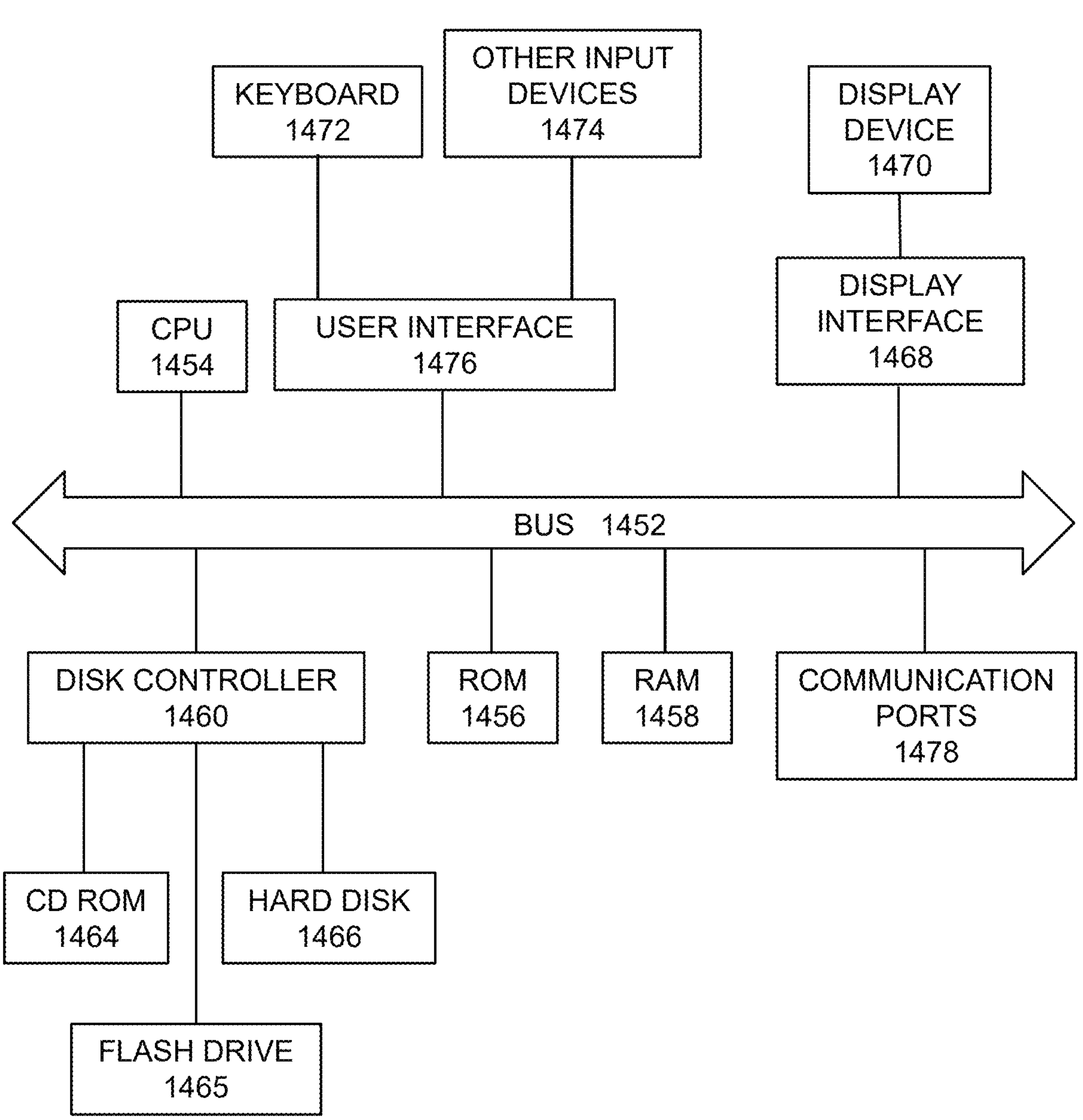
FIG. 14C is a function block diagram depicting salient components of an example computing device for implementing the subject matters described herein.

FIG. 14C shows a function block diagram of example hardware for a standalone computer architecture 1450, such as the architecture depicted in FIG. 14A, that may be used to contain and/or implement the subject matter described herein. A bus 1452 may serve as the information highway interconnecting the other illustrated components of the hardware. A processing system 1454 labeled CPU (central processing unit) (e.g., one or more computer processors), may perform calculations and logic operations required to execute a program/software/module. A non-transitory computer-readable storage medium, such as read only memory (ROM) 1456 and random access memory (RAM) 1458, may be in communication with the processing system 1454 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium thru communication port 1478.

A disk controller 1460 interfaces one or more optional disk drives to the system bus 1452. These disk drives may be external or internal flash memory drives 1465, external or internal CD-ROM, CD-R, CD-RW or DVD drives 1464, or external or internal hard disk drives 1466. As indicated previously, these various disk drives and disk controllers are optional devices.

If needed, the processor 1454 may access each of the following components: real-time data buffer, conveyors, file input processor, database index shared access memory loader, reference data buffer and data managers. Each component may include a software application stored in one or more of the disk drives connected to the disk controller 1460, the ROM 1456 and/or the RAM 1458.

A display interface 1468 may permit information from the bus 1452 to be displayed on a display 1470 in audio, video, graphical, text, or alphanumeric format.

In addition to the standard computer-type components, the hardware may also include data input devices, such as a keyboard 1472, or other input device 1474, such as a microphone, remote control, pointer, mouse, touch screen, and/or joystick.

Figure 14D:
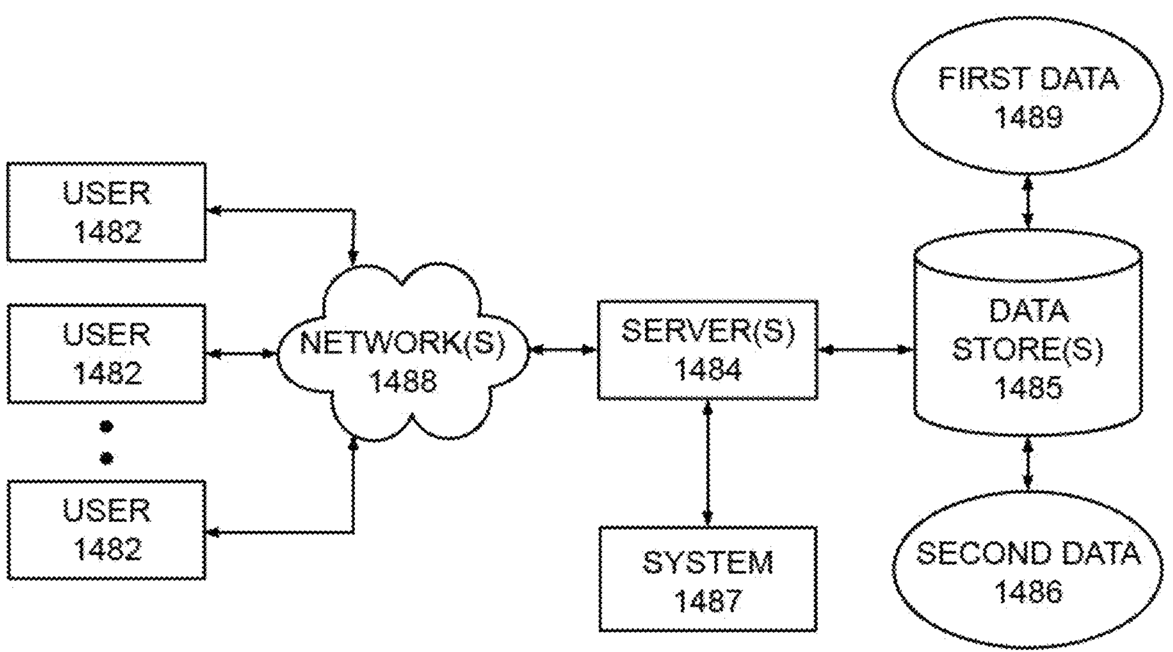
FIG. 14D is a block diagram illustrating an example computer-implemented environment.

FIG. 14D depicts a computer-implemented environment 1480 wherein users 1482 can interact with a system 1487 hosted on one or more servers 1484 through a network 1488. The system 1487 contains software operations or routines. The users 1482 can interact with the system 1487 through a number of ways, such as over one or more networks 1488. One or more servers 1484 accessible through the network(s) 1488 can host the system 1487. The processing system 1487 has access to a non-transitory computer-readable memory in addition to one or more data stores 1485. The one or more data stores 1485 may contain a first data 1489 as well as a second data 1486. It should be understood that the system 1487 could also be provided on a stand-alone computer for access by a user.

This written description describes example embodiments of the subject matter, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

Additionally, used herein, terms such as "top", "bottom", "small", "large", "horizontal", "vertical", "depth direction" are intended to provide relative orientations for the purposes of description, and are not intended to designate an absolute frame of reference. Further, the order of blocks in process flowcharts or flow diagrams do not inherently indicate any particular order nor imply any limitations.

Although the subject matter has been described with reference to specific embodiments thereof, these embodiments are merely illustrative, and not restrictive of, the invention. Various modifications or changes to the specifically disclosed example embodiments will be suggested to persons skilled in the art. In summary, the scope of the subject matter should not be restricted to the specific example embodiments disclosed herein, and all modifications that are readily suggested to those of ordinary skill in the art should be included within the spirit and purview of this application and scope of the appended claims.

What is claimed is:

1. A computer-implemented method comprising:

receiving a three-dimensional (3D) model representing a soil domain and a ground motion time history of a seismic event, the ground motion time history measured at the top of the soil domain;

generating a single-column model containing nodal points mapped from nodes of the 3D model in the soil domain's depth direction;

determining a time interval for calculating soil motion and stresses at the nodal points along the single-column model from the ground motion time history, the time interval used to perform fast Fourier Transform (FFT) on the ground motion time history; and simulating the seismic event based on the 3D model applied with the soil motion and stresses transferred from the single-column model.

2. The method of claim 1, wherein the 3D model comprises an unstructured mesh.

3. The method of claim 1, wherein the single-column model is to represent horizontal soil layers in the soil domain.

4. The method of claim 1, wherein the time interval is determined for limiting computer memory usage.

5. The method of claim 4, wherein said limiting computer memory usage is based on available computer memory in a computer for simulating the seismic event.

6. The method of claim 5, wherein the computer memory usage is limited to a predetermined percentage of the available computer memory.

7. The method of claim 1, said determining the time interval further comprises updating the single-column model.

8. The method of claim 7, wherein the updating the single-column model is from one of the two ends.

9. The method of claim 7, wherein the single-column model contains one-dimensional (1D) elements with each 1D element located between a pair of neighboring nodal points.

10. The method of claim 9, wherein the single-column model is updated by merging neighboring 1D elements together.

11. The method of claim 10, wherein the time interval is determined for limiting condition number of stiffness matrix of the updated single-column model.

12. The method of claim 1, wherein the ground motion time history is tabulated in an input time interval different from the determined time interval.

13. The method of claim 1, wherein the amplitude of the calculated soil motion at the bottom is limited to a predetermined factor to the amplitude of the ground motion at the top of the single-column model.

14. The method of claim 1, wherein the calculated soil motion at bottom is calculated in frequency domain.

15. The method of claim 1, wherein the soil motion at the bottom is calculated from the ground motion at the top of the single-column model in a deconvolution scheme.

16. The method of claim 1, wherein said simulating the seismic event includes a structure located on the top of the soil domain.

17. The method of claim 16, wherein said simulating the seismic event is to determine the structure's vitality in the seismic event.

18. The method of claim 16, wherein said simulating the seismic event includes soil-structure interaction between the structure and the soil domain.

19. A system comprising:

a memory storing instructions;

one or more processors coupled to the memory, the one or more processors executing the instructions from the memory to perform a method:

receiving a three-dimensional (3D) model representing a soil domain and a ground motion time history of a seismic event, the ground motion time history measured at the top of the soil domain;

generating a single-column model containing nodal points mapped from nodes of the 3D model in the soil domain's depth direction;

determining a time interval for calculating soil motion and stresses at the nodal points along the single-column model from the ground motion time history, the time interval used to perform fast Fourier Transform (FFT) on the ground motion time history; and simulating the seismic event based on the 3D model applied with the soil motion and stresses transferred from the single-column model.

20. A non-transitory computer-readable medium storing instructions for commanding one or more processors to perform operations comprising:

receiving a three-dimensional (3D) model representing a soil domain and a ground motion time history of a seismic event, the ground motion time history measured at the top of the soil domain;

generating a single-column model containing nodal points mapped from nodes of the 3D model in the soil domain's depth direction;

determining a time interval for calculating soil motion and stresses at the nodal points along the single-column model from the ground motion time history, the time interval used to perform fast Fourier Transform (FFT) on the ground motion time history; and simulating the seismic event based on the 3D model applied with the soil motion and stresses transferred from the single-column model.

* * * * *